(12) United States Patent
Dayton et al.

(10) Patent No.: US 10,788,066 B2
(45) Date of Patent: Sep. 29, 2020

(54) DOUBLE THREADED STANDOFF FASTENER

(71) Applicants: NUCOR CORPORATION, Charlotte, NC (US); ASIA FASTENING (US), INC., Wilmington, DE (US)

(72) Inventors: Lionel E. Dayton, Minneapolis, MN (US); Richard W. Lukes, Decorah, IA (US)

(73) Assignees: Nucor Corporation, Charlotte, NC (US); Asia Fastening (US), Inc., Wilmington, DE (US)

( * ) Notice: Subject to any disclaimer, the term of this patent is extended or adjusted under 35 U.S.C. 154(b) by 313 days.

(21) Appl. No.: 15/584,383

(22) Filed: May 2, 2017

(65) Prior Publication Data

US 2017/0314594 A1  Nov. 2, 2017

Related U.S. Application Data

(60) Provisional application No. 62/330,633, filed on May 2, 2016.

(51) Int. Cl.
| | |
|---|---|
| F16B 5/02 | (2006.01) |
| E04B 1/41 | (2006.01) |
| F16B 25/00 | (2006.01) |
| E04B 5/29 | (2006.01) |
| E04B 5/40 | (2006.01) |
| E04B 5/17 | (2006.01) |
| F16B 25/10 | (2006.01) |

(52) U.S. Cl.
CPC .......... *F16B 5/0275* (2013.01); *E04B 1/4157* (2013.01); *E04B 5/17* (2013.01); *E04B 5/29* (2013.01); *E04B 5/40* (2013.01); *F16B 25/0021* (2013.01); *F16B 25/0031* (2013.01); *F16B 25/103* (2013.01)

(58) Field of Classification Search
CPC ............................. F16B 35/06; F16B 5/0275
USPC ......................................... 411/386, 400, 401
See application file for complete search history.

(56) References Cited

U.S. PATENT DOCUMENTS

| 910,757 A | 1/1909 | Wilson |
|---|---|---|
| 1,434,915 A | 11/1922 | Scholfield |
| (Continued) | | |

FOREIGN PATENT DOCUMENTS

| GB | 1269463 A | 4/1972 |
|---|---|---|
| JP | 2004270801 A | 9/2004 |
| (Continued) | | |

OTHER PUBLICATIONS

Lauer, Douglas F., "Ultimate Strength Analysis of Partially Composite and Fully Composite Open-Web Steel Joists"; Master's Thesis Paper, Virginia Polytechnic Institute and State University, Blacksburg, VA, Oct. 1994.

(Continued)

*Primary Examiner* — Flemming Saether
(74) *Attorney, Agent, or Firm* — Hahn Loeser & Parks LLP

(57) ABSTRACT

Presently disclosed is a standoff fastener for use in a compound floor structure. The threaded fastener includes a threaded standoff portion designed to accept a nut which has a diameter larger than a head portion of the standoff fastener. The head portion is located centrally within the fastener in order to reduce a tendency of the fastener to pivot within a driver during the fastening process.

19 Claims, 34 Drawing Sheets

(56) References Cited

U.S. PATENT DOCUMENTS

| | | | |
|---|---|---|---|
| 1,734,358 A | 11/1929 | Yeager |
| 1,804,132 A | 5/1931 | Tashjian |
| 1,815,075 A | 7/1931 | Sersen |
| 1,828,078 A | 10/1931 | Sealey |
| 1,863,258 A | 6/1932 | Tashjian |
| 1,898,736 A | 2/1933 | Melvin |
| 2,053,873 A | 9/1936 | Niederhofer |
| 2,078,069 A | 4/1937 | Eliel |
| 2,096,921 A | 10/1937 | Sahlberg |
| 2,132,220 A | 10/1938 | Powers |
| 2,167,208 A | 7/1939 | Hilpert |
| 2,180,317 A | 11/1939 | Davis |
| 2,246,457 A | 6/1941 | Schultz |
| 2,477,394 A | 7/1949 | Spiker |
| 2,558,946 A | 7/1951 | Fromson |
| 2,597,837 A | 5/1952 | Lindsay |
| 2,684,134 A | 7/1954 | Ruppel |
| 2,703,003 A | 3/1955 | Ruppel |
| 2,955,493 A | 10/1960 | Olsen |
| 3,094,813 A | 6/1963 | Van Rensselaer |
| 3,288,015 A | 11/1966 | Hanneman |
| 3,307,304 A | 3/1967 | Klausner |
| 3,362,121 A | 1/1968 | Weber |
| 3,363,379 A | 1/1968 | Curran |
| 3,392,499 A | 7/1968 | McManus |
| 3,397,497 A | 8/1968 | Shea et al. |
| 3,438,168 A | 4/1969 | Tischuk |
| 3,457,818 A | 7/1969 | McManus |
| 3,469,491 A | 9/1969 | Munsey |
| 3,527,007 A | 9/1970 | McManus |
| 3,566,567 A | 3/1971 | Watanabe |
| 3,600,868 A | 8/1971 | Wilson, Jr. et al. |
| 3,624,980 A | 12/1971 | McManus |
| 3,683,580 A | 8/1972 | McManus |
| 3,719,015 A | 3/1973 | Misawa |
| 3,728,835 A | 4/1973 | McManus |
| 3,878,759 A | 4/1975 | Carlson |
| 3,902,350 A | 9/1975 | McManus |
| 3,979,868 A | 9/1976 | Butts et al. |
| 4,003,179 A | 1/1977 | Gilb |
| 4,015,504 A * | 4/1977 | Rosan, Sr. .......... F16B 25/0015 411/389 |
| 4,040,328 A | 8/1977 | Muenchinger |
| 4,056,908 A | 11/1977 | McManus |
| 4,102,105 A | 7/1978 | Taylor et al. |
| 4,114,508 A | 9/1978 | Jeal |
| 4,115,971 A | 9/1978 | Varga |
| 4,121,391 A | 10/1978 | Schroeder |
| 4,186,535 A | 2/1980 | Morton |
| 4,189,883 A | 2/1980 | McManus |
| 4,192,217 A | 3/1980 | Schwartzman |
| 4,223,585 A * | 9/1980 | Barth ................ F16B 23/0076 411/386 |
| 4,259,822 A | 4/1981 | McManus |
| 4,285,173 A | 8/1981 | Grearson et al. |
| 4,295,310 A | 10/1981 | McManus |
| 4,295,768 A | 10/1981 | Skierski |
| 4,315,340 A | 2/1982 | Veldman |
| 4,323,326 A | 4/1982 | Okada et al. |
| 4,333,280 A | 6/1982 | Morton |
| 4,368,552 A | 1/1983 | Sugiyama |
| 4,397,150 A | 8/1983 | Paller |
| 4,423,576 A | 1/1984 | Farina et al. |
| 4,430,036 A | 2/1984 | Chapman |
| 4,432,178 A | 2/1984 | Taft |
| 4,432,289 A | 2/1984 | Norman et al. |
| 4,433,524 A | 2/1984 | Matson |
| 4,454,695 A | 6/1984 | Person |
| 4,473,984 A | 10/1984 | Lopez |
| 4,480,951 A | 11/1984 | Regensburger |
| 4,507,901 A | 4/1985 | Carroll |
| 4,518,279 A | 5/1985 | Suttles |
| 4,527,372 A | 7/1985 | Ryan |
| 4,534,690 A | 8/1985 | Barth |
| 4,566,240 A | 1/1986 | Schilger |
| 4,570,400 A | 2/1986 | Slager et al. |
| 4,587,782 A | 5/1986 | Shubow |
| 4,592,184 A | 6/1986 | Person et al. |
| 4,593,507 A | 6/1986 | Hartman |
| 4,597,233 A | 7/1986 | Rongoe, Jr. |
| 4,619,090 A | 10/1986 | McManus |
| 4,653,237 A | 3/1987 | Taft |
| 4,700,519 A | 10/1987 | Person et al. |
| 4,726,159 A | 2/1988 | Stohs |
| 4,741,138 A | 5/1988 | Rongoe, Jr. |
| 4,764,069 A * | 8/1988 | Reinwall .............. B25B 13/5091 411/397 |
| 4,781,506 A | 11/1988 | Roberts et al. |
| 4,802,786 A | 2/1989 | Yauger et al. |
| 4,821,480 A | 4/1989 | Silvey |
| 4,845,908 A | 7/1989 | Stohs |
| 4,883,396 A * | 11/1989 | Shamah .............. E04G 23/0222 411/55 |
| 4,973,209 A | 11/1990 | Essom et al. |
| 4,982,545 A | 1/1991 | Stromback |
| 5,000,638 A | 3/1991 | Essom et al. |
| 5,054,755 A | 10/1991 | Hawkes |
| 5,088,869 A | 2/1992 | Greenslade |
| 5,141,376 A | 8/1992 | Williams et al. |
| 5,205,466 A | 4/1993 | Ker |
| 5,213,459 A | 5/1993 | Palm |
| 5,291,811 A | 3/1994 | Goss |
| 5,304,023 A | 4/1994 | Toback et al. |
| 5,304,032 A | 4/1994 | Bosna et al. |
| 5,382,195 A | 1/1995 | Hiler |
| 5,383,320 A | 1/1995 | Sorton |
| 5,395,195 A | 3/1995 | Fulmer |
| 5,413,444 A | 5/1995 | Thomas et al. |
| 5,415,507 A * | 5/1995 | Janusz ................ E04G 23/0222 411/383 |
| 5,433,558 A | 7/1995 | Gray |
| 5,487,633 A | 1/1996 | Roberts |
| 5,544,464 A | 8/1996 | Dutil |
| 5,551,818 A | 9/1996 | Köppel |
| 5,597,357 A | 1/1997 | Roberts |
| 5,605,423 A | 2/1997 | Janusz |
| 5,613,968 A * | 3/1997 | Lin .................... A61B 17/7001 411/389 |
| 5,640,823 A | 6/1997 | Bergeron et al. |
| 5,657,596 A | 8/1997 | Powers, III |
| 5,699,644 A | 12/1997 | Smith |
| 5,746,039 A | 5/1998 | Nystrom |
| 5,746,096 A | 5/1998 | Lukes |
| 5,755,542 A | 5/1998 | Janusz et al. |
| 5,761,873 A | 6/1998 | Slater |
| 5,816,012 A | 10/1998 | Willis |
| 5,827,030 A | 10/1998 | Dicke |
| 5,836,131 A | 11/1998 | Viola et al. |
| 5,836,133 A | 11/1998 | Bergeron et al. |
| 5,882,161 A | 3/1999 | Birkelbach |
| 5,884,923 A | 3/1999 | Pratt |
| 5,941,035 A | 8/1999 | Purse |
| 5,947,670 A | 9/1999 | Larson |
| 5,961,267 A | 10/1999 | Goss et al. |
| 5,964,560 A | 10/1999 | Henriksen |
| 6,064,755 A | 5/2000 | Some |
| 6,109,851 A | 8/2000 | Bauer et al. |
| 6,230,467 B1 | 5/2001 | Leek |
| 6,250,866 B1 | 6/2001 | Devine |
| 6,253,521 B1 | 7/2001 | Gavin et al. |
| 6,261,040 B1 | 7/2001 | Reynolds et al. |
| 6,272,447 B1 | 8/2001 | Gavin et al. |
| 6,357,191 B1 | 3/2002 | Ault et al. |
| 6,408,589 B1 | 6/2002 | Bousquet |
| 6,415,575 B1 | 7/2002 | Thompson |
| 6,427,416 B1 | 8/2002 | Rassel |
| 6,446,409 B1 | 9/2002 | Emerson |
| 6,488,257 B2 | 12/2002 | McSwain |
| 6,494,655 B1 | 12/2002 | Pritchard |
| 6,494,656 B1 | 12/2002 | Boyer et al. |
| 6,585,141 B2 | 7/2003 | Goss et al. |
| 6,622,569 B2 | 9/2003 | Mallick et al. |
| 6,668,510 B2 | 12/2003 | McManus |
| 6,672,791 B2 | 1/2004 | Schubring et al. |

(56) References Cited

U.S. PATENT DOCUMENTS

| | | | |
|---|---|---|---|
| 6,676,353 B1 | 1/2004 | Haytayan | |
| 6,698,148 B1 | 3/2004 | Manna et al. | |
| 6,712,708 B2 | 3/2004 | Boyer et al. | |
| 6,761,005 B1 | 7/2004 | Daudet et al. | |
| 6,827,538 B2* | 12/2004 | Doppke | F16B 39/30 411/311 |
| 6,837,013 B2 | 1/2005 | Foderberg et al. | |
| 6,896,462 B2 | 5/2005 | Stevenson et al. | |
| 6,918,727 B2* | 7/2005 | Huang | F16B 5/0275 411/107 |
| 6,993,881 B1 | 2/2006 | Ruble et al. | |
| 7,013,613 B1 | 3/2006 | Boellner et al. | |
| 7,017,314 B2 | 3/2006 | Pace | |
| 7,028,435 B2 | 4/2006 | Walker et al. | |
| 7,195,099 B2 | 3/2007 | Harney | |
| 7,237,413 B2 | 7/2007 | Monahan et al. | |
| 7,303,321 B2 | 12/2007 | Miller et al. | |
| 7,389,620 B1 | 6/2008 | McManus | |
| 7,416,083 B2 | 8/2008 | Bando | |
| 7,418,774 B2 | 9/2008 | Joseph et al. | |
| 7,497,054 B2 | 3/2009 | Takeuchi et al. | |
| 7,562,500 B2 | 7/2009 | Siu | |
| 7,779,590 B2 | 8/2010 | Hsu et al. | |
| 7,963,732 B2 | 6/2011 | Stager et al. | |
| 8,209,934 B2* | 7/2012 | Pettingale | E04B 1/4178 411/389 |
| 8,348,572 B2 | 1/2013 | Friederich et al. | |
| 8,408,856 B2 | 4/2013 | Ernst et al. | |
| 8,529,178 B2 | 9/2013 | Dayton et al. | |
| 8,621,806 B2* | 1/2014 | Studebaker | E04B 5/40 52/319 |
| 8,636,456 B2 | 1/2014 | Dayton et al. | |
| 9,004,835 B2 | 4/2015 | Dayton et al. | |
| 9,267,527 B2 | 2/2016 | Dayton et al. | |
| 9,797,430 B2 | 10/2017 | Dayton et al. | |
| 2001/0009638 A1 | 7/2001 | Crawford et al. | |
| 2003/0093961 A1 | 5/2003 | Grossman | |
| 2003/0133770 A1 | 7/2003 | Schultz | |
| 2003/0143057 A1 | 7/2003 | Shinjo | |
| 2003/0223842 A1 | 12/2003 | Shinjo | |
| 2005/0188638 A1 | 9/2005 | Pace | |
| 2006/0228186 A1 | 10/2006 | Shinjo | |
| 2006/0236815 A1 | 10/2006 | Beecherl et al. | |
| 2006/0291979 A1 | 12/2006 | Bechtel, Jr. et al. | |
| 2007/0169327 A1 | 7/2007 | Cobzaru et al. | |
| 2007/0234547 A1 | 10/2007 | Lanni et al. | |
| 2007/0243043 A1 | 10/2007 | Price et al. | |
| 2008/0005994 A1 | 1/2008 | Harney | |
| 2008/0016667 A1 | 1/2008 | Lanni et al. | |
| 2008/0017840 A1 | 1/2008 | Harney | |
| 2008/0179477 A1 | 7/2008 | Harney | |
| 2008/0232930 A1 | 9/2008 | Jokisch | |
| 2008/0236341 A1 | 10/2008 | Kletecka et al. | |
| 2009/0003967 A1 | 1/2009 | Luna | |
| 2009/0188187 A1 | 7/2009 | Studebaker et al. | |
| 2009/0188192 A1 | 7/2009 | Studebaker et al. | |
| 2009/0286608 A1 | 11/2009 | Price et al. | |
| 2013/0232769 A1* | 9/2013 | Wooten | F16B 25/0031 29/525.11 |
| 2013/0272816 A1* | 10/2013 | Vilas | F16B 5/0275 411/429 |
| 2015/0101458 A1* | 4/2015 | Saje | B25B 13/065 81/121.1 |

FOREIGN PATENT DOCUMENTS

| | | |
|---|---|---|
| WO | 2004031507 A1 | 4/2004 |
| WO | 2008116269 A1 | 10/2008 |

OTHER PUBLICATIONS

Mujagic et al., "Drilled Standoff Screws for Shear Connection in Light Composite Steel-Concrete Trusses"; Journal of Construction Steel Research, vol. 63, No. 10, Oct. 2007, pp. 1404-1414. Also, Department of Civil and Environmental Engineering, Virginia Polytechnic Institute and State University, Blacksburg, VA; Online: Mar. 1, 2007.

Acument Global Technologies North America Catalog, Fastening Solutions, CAMCAR Ring Screw, Revised Feb. 1, 2007.

Elco Construction Products Catalog Drill-Flex Structural Fasteners, 2007.

Acument Global Technologies North America Catalog, Threaded Fasteners for Plastics, Revised Feb. 1, 2007.

Elco Building and Construction Catalog, at least as early as 2009.

* cited by examiner

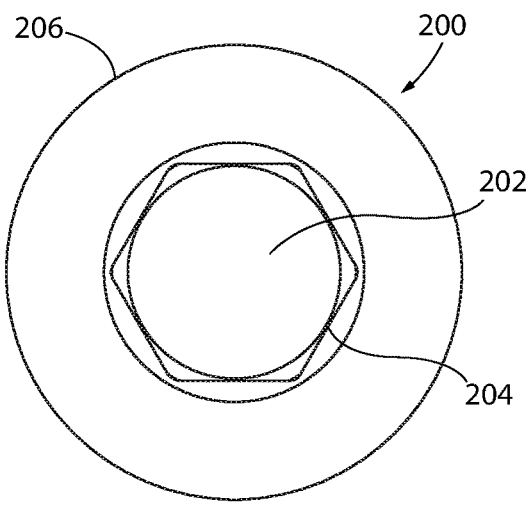
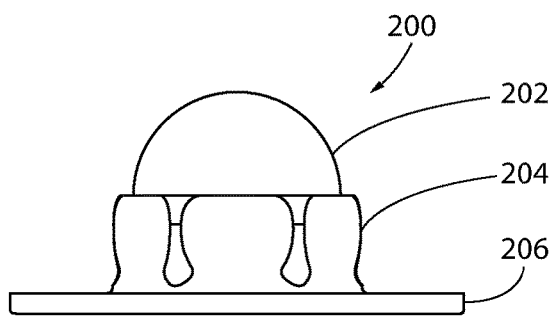
FIG. 10A　　　　　FIG. 10B
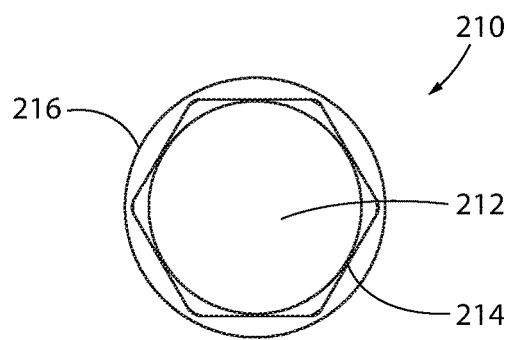
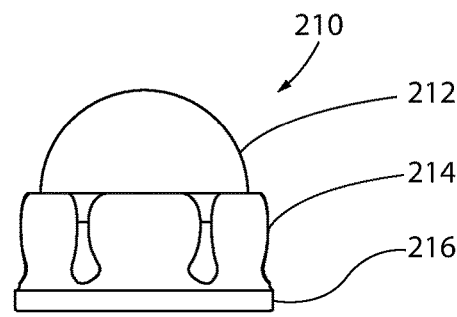
FIG. 11A　　　　　FIG. 11B
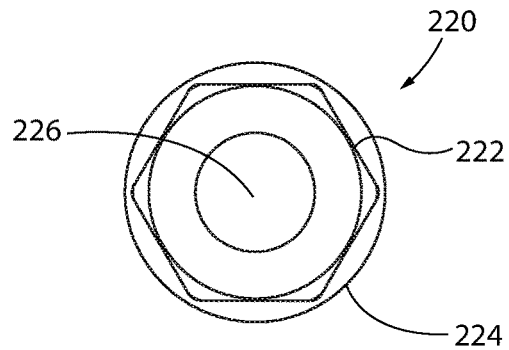
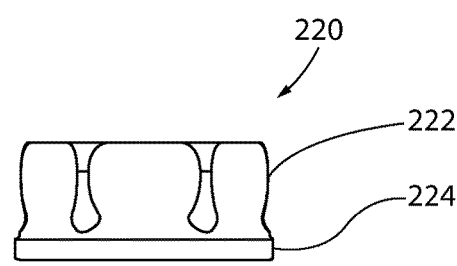
FIG. 12A　　　　　FIG. 12B

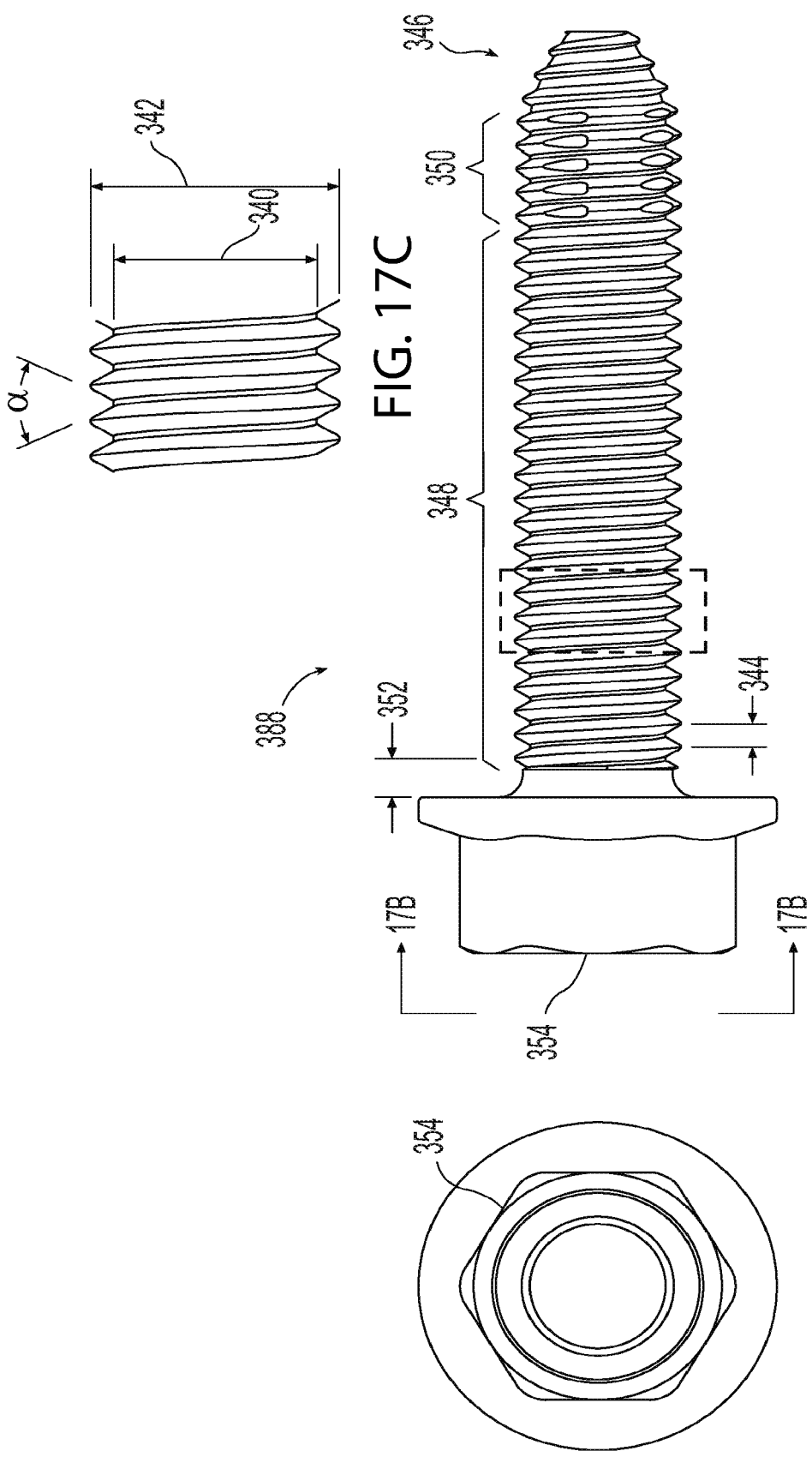

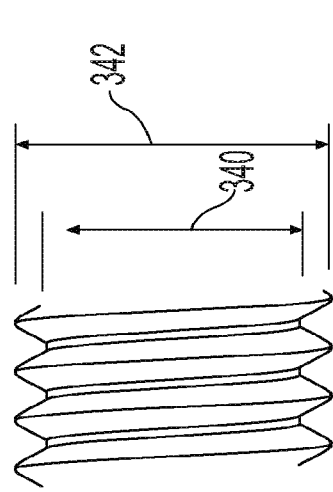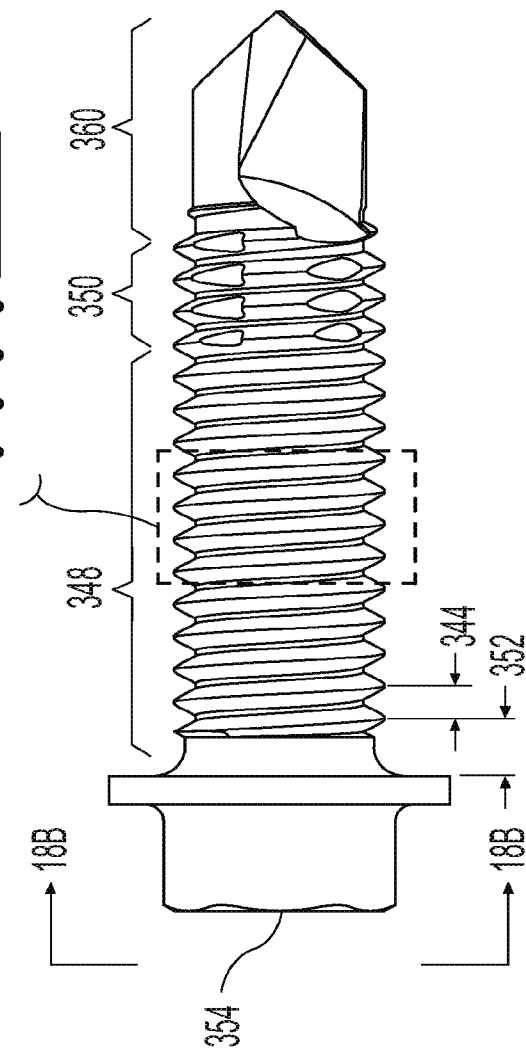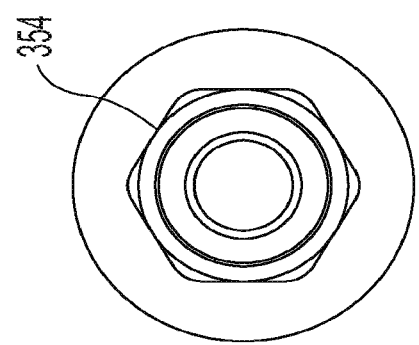
FIG. 18C
FIG. 18A
FIG. 18B

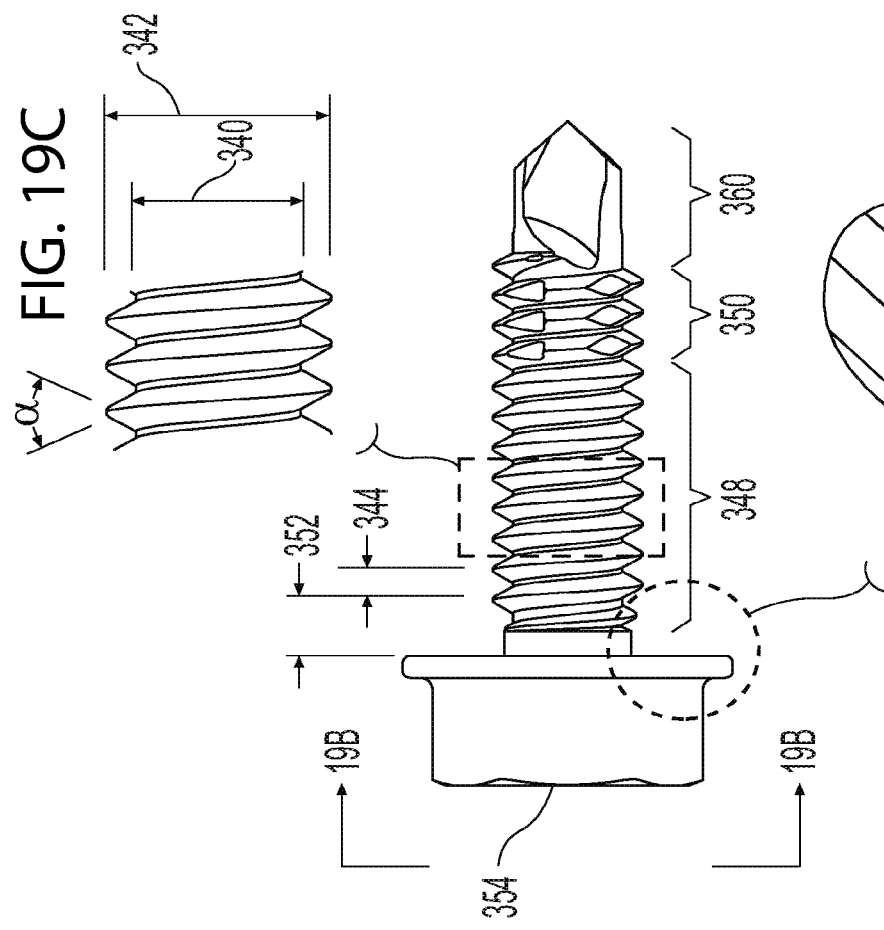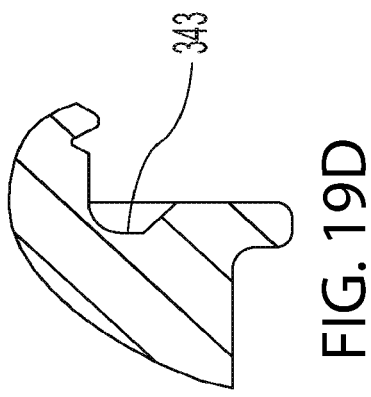

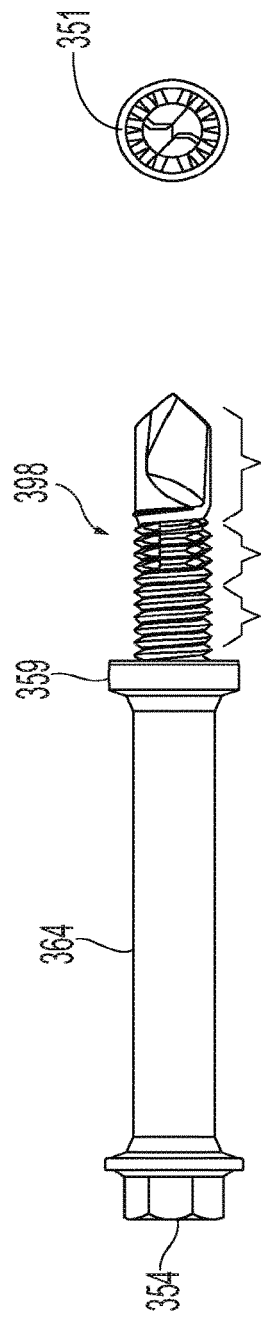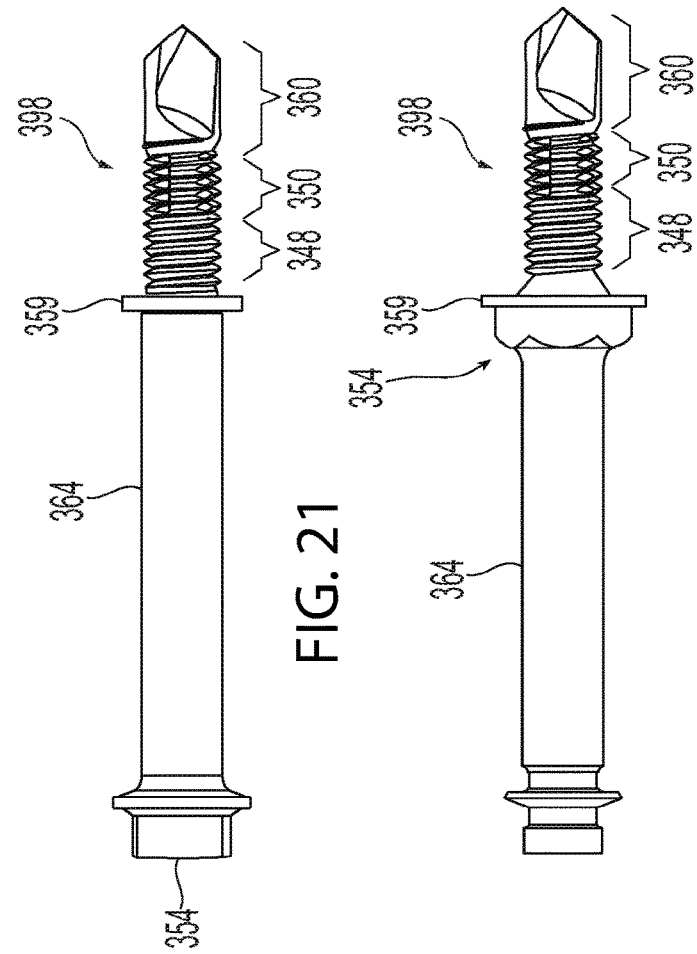
FIG. 20B
FIG. 20A
FIG. 21
FIG. 22

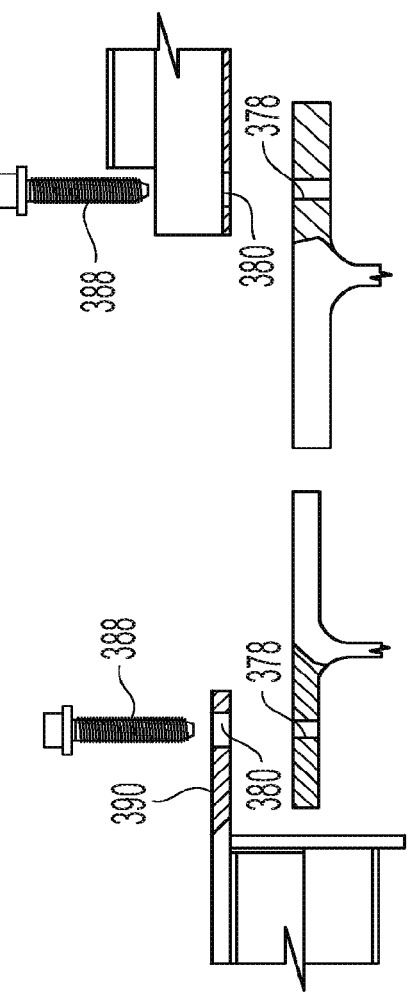
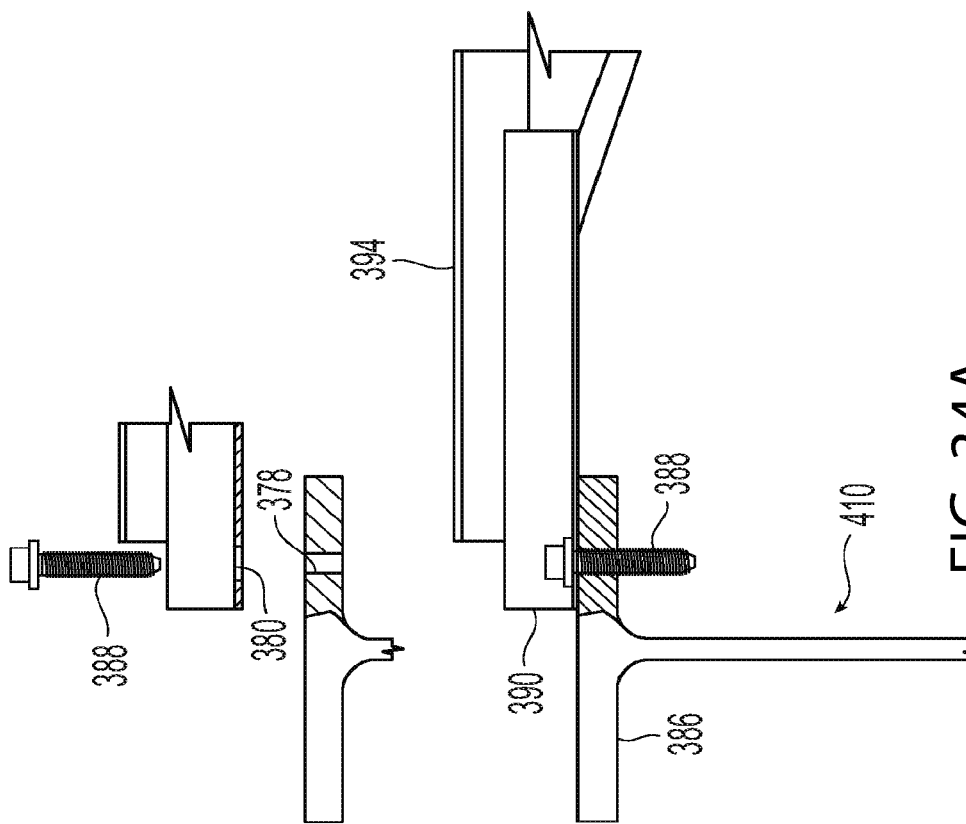
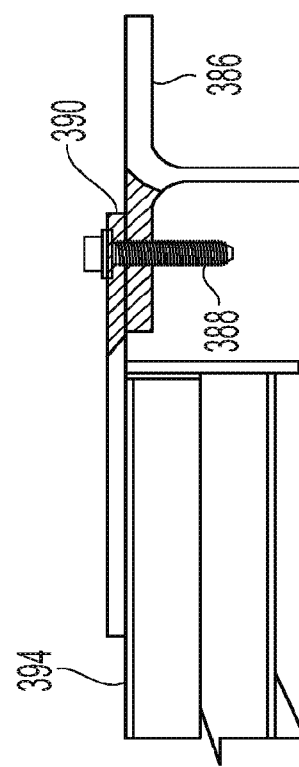

DOUBLE THREADED STANDOFF FASTENER

This application claims priority to, and the benefit of, U.S. Provisional Application No. 62/330,633 filed on May 2, 2016 with the United States Patent Office, which is hereby incorporated by reference.

BACKGROUND AND SUMMARY

The present disclosure relates generally to threaded fasteners for compound floor structures. Cement corrugated floor may be constructed by placing corrugated sheet steel over a framework of trusses and other load bearing structures. The corrugated sheet may be electrified and reinforcing rods positioned for welding to the corrugated sheet, forming a compound floor structure. Cement is then poured and hardens around standoff fasteners and/or other reinforcing rods. As the cement hardens, the standoff fasteners act to grip the cement and increase the strength of the compound floor structure.

Threaded standoff fasteners have been configured with an end head portion designed to accept torque from a driver. An example of such a standoff fastener is described in U.S. Pat. No. 5,605,423. A problem with such standoff fasteners has been that the head portion is located on the end of the fastener creating unwanted torque that moves the fastener away from a desired location. During installation a driver encapsulates the head, leaving a majority of the fastener's structure otherwise exposed. As a result, the fastener structure acts as a lever arm against the driver and has a tendency to rotate out of contact with the driver during engagement with a subfloor. There is a need for an improved fastener which enables a more efficient method of installing standoffs without unwanted rotation out of alignment.

Another problem with previous standoff fasteners is that the diameter of the fastener was relatively limited. As the diameter of the fastener increases, the general strength of the finished composite floor structure may be increased. This is especially true for the end portion extending above the corrugated material, and the portion in direct contact with the corrugated material. However, configurations of standoff fasteners limit the diameter of the standoff portion to less than the major diameter of the head portion designed to transfer torque. Further, a single integral standoff fastener with a large diameter is expensive to produce and not economically feasible given the number of fasteners required for a composite floor. Accordingly, there is a need to increase the diameter of the standoff fastener in a cost-effective and efficient manner.

Presently disclosed is a standoff fastener having a head portion located between a screw portion and a standoff portion having threads. An anchor portion or anchor nut may be threaded onto the standoff portion after the fastener is fixed in the corrugated subfloor. In this manner, the anchor nut may have a diameter larger than the head portion of the fastener. The placement of the head portion between the screw portion and standoff portion decrease movement of the fastener within a socket driver and increases end use control of the fastener. This improves installation speed and reduces cost.

Presently disclosed is a fastener comprising a head portion disposed between a screw portion and a standoff portion; the head portion having a key shape which is selected from a group consisting of lobular, splinular, and polygonal; the key shape capable of accepting torque from a driver oriented on drive axis of the fastener; the standoff portion being longer than the screw portion, the standoff portion having a threaded segment, where a diameter of the standoff portion is less than or equal to a diameter of the head portion; the screw portion including a fluted lead end, and a thread-forming portion having lobes adapted to enable formation of threads into a metal structure.

Also disclosed is a fastener, where the key shape is lobular and has at least 5 lobes.

Further disclosed is a fastener, where the key shape is splinular and has at least 5 splines.

Additionally disclosed is a fastener where the key shape is polygonal and has at least 5 sides.

Further disclosed is a fastener, where the screw portion has a first thread and the standoff portion includes a second thread which is different from the first thread.

Also disclosed is a fastener, where the screw portion has a first thread and the standoff portion includes a second thread which is the same as the first thread.

Additionally disclosed is a fastener, where an anchor nut with a diameter larger than the diameter of the head portion is attached to the threads of the standoff portion.

Further disclosed is a fastener, where the head portion further comprises a seat portion having a diameter larger than the diameter of the head portion, the seat portion located on a side of the head portion closest to the screw portion.

Additionally disclosed is a fastener, where a second standoff portion is placed between the head portion and the screw portion.

Further disclosed is a fastener, where the threads of the standoff portion extend up to 90% of a length of the standoff portion.

Also disclosed is an embodiment of a fastener comprising: a head portion, a screw portion including a fluted lead end, an anchor portion, and a shank portion; the fastener having a total length, defined by a tip of the fluted lead end and an end of the anchor portion; the head portion disposed away from the tip of the fluted lead end no more than 50% of the total length, the head portion having a key shape which is selected from a group consisting of lobular, splinular, and polygonal; the key shape capable of accepting torque from a driver oriented on drive axis of the fastener; the standoff portion being longer than the screw portion, the standoff portion having a threaded segment, where a diameter of the standoff portion is less than or equal to a diameter of the head portion;

Also disclosed is a fastener, where the screw portion includes a thread-forming portion having lobes adapted to enable formation of threads into a metal structure.

Additionally disclosed is a fastener, where the key shape is lobular and has at least 4 lobes.

Further disclosed is a fastener, where the key shape is splinular and has at least 4 splines.

Additionally disclosed is a fastener, where the key shape is polygonal and has at least 4 sides.

Also disclosed is a fastener, where the screw portion has a first thread and the standoff portion includes a second thread which is different from the first thread.

Further disclosed is a fastener, where the screw portion has a first thread and the standoff portion includes a second thread which is the same as the first thread.

Additionally disclosed is a fastener, where an anchor nut with a diameter larger than the diameter of the head portion is attached to the threads of the standoff portion.

Further disclosed is a fastener, where the head portion further comprises a seat portion having a diameter larger than the diameter of the head portion, the seat portion located on a side of the head portion closest to the screw portion.

Also disclosed is a fastener, where a second standoff portion is placed between the head portion and the screw portion.

Further disclosed is a fastener, where the threads of the standoff portion extend up to 90% of a length of the standoff portion.

BRIEF DESCRIPTION OF THE DRAWINGS

Reference is made to the accompanying drawings in which particular embodiments and further benefits of the invention are illustrated as described in more detail in the description below, in which:

FIGS. 10A and 10B are side and top views of a disc anchor;

FIGS. 11A and 11B are side and top views of a capped anchor;

FIGS. 12A and 12B are side and top views of an anchor;

FIGS. 17A-17C are side and end views of a thread-forming fastener of the present disclosure;

FIGS. 18A-18C illustrate side and end views of a thread-forming fastener of the present disclosure;

FIGS. 19A-19D illustrate side and end views of an alternative self-drilling, thread-forming fastener of the present disclosure;

FIGS. 20A and 20B illustrate a side view and front view of a standoff fastener;

FIG. 21 Illustrates a side view of a standoff fastener;

FIG. 22 illustrates a side view of a standoff fastener with a centrally located head portion;

FIGS. 33A and 33B illustrate a flush mounted joist seat; and

FIGS. 34A and 34B illustrate an alternative joist seat.

DETAILED DESCRIPTION OF THE DRAWINGS

Generally, a standoff fastener acts to prevent lateral movement of a hardened concrete slab in a finished compound floor structure. The standoff fastener is attached perpendicular to a corrugated metal subfloor, and concrete material is poured over the metal subfloor encapsulating the standoff fastener. The part of the standoff fastener encapsulated by the concrete is the anchor portion, which increases the general strength of the compound floor structure. This is accomplished by the anchor portion having a larger diameter than other portions of the standoff fastener. As the concrete material forms around the fastener, the anchor portion by virtue of the larger diameter will make the entire floor structure resist lateral movement.

Figure 1:
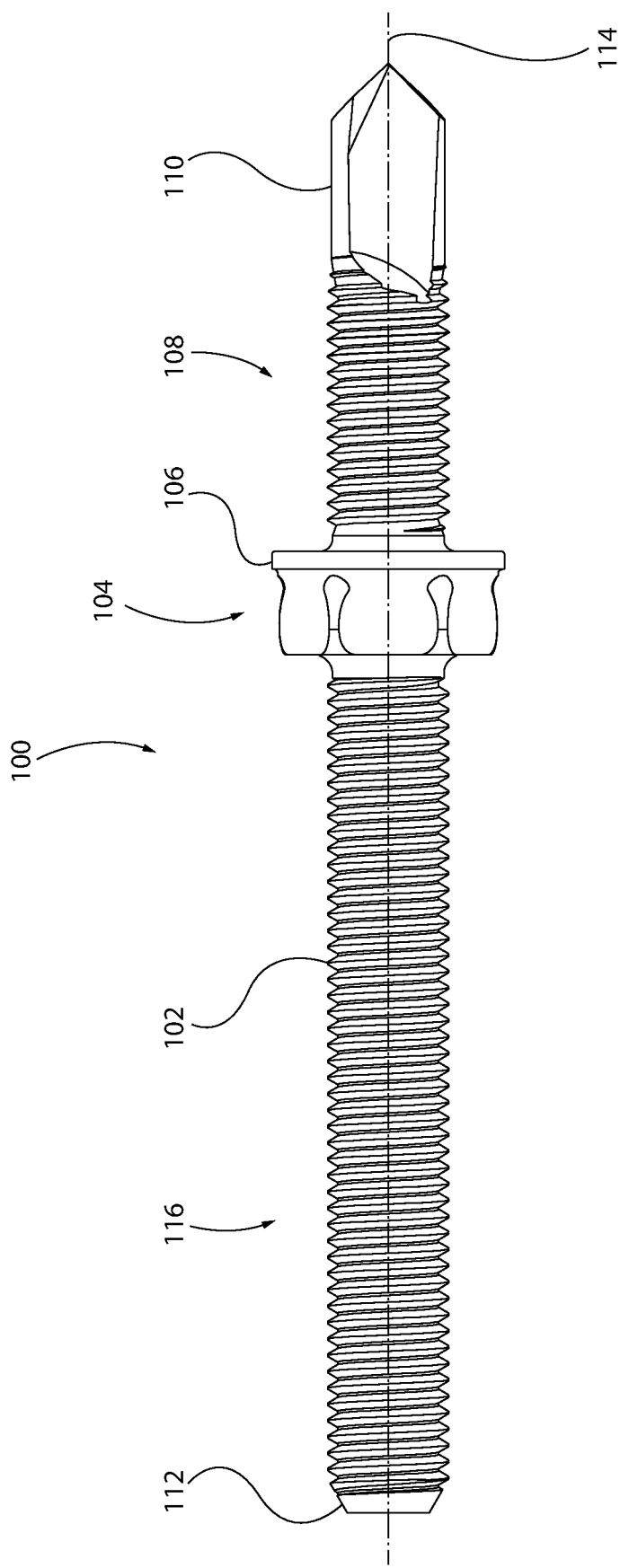
FIG. 1 is a side view of a fastener with a threaded standoff portion.

As shown in FIG. 1, a doubled threaded standoff fastener 100 is aligned generally along a central axis 114. A standoff portion 116 has an end portion 112, and a shank portion 102 which is attached to the head portion 104. The head portion 104 may have a key shape and a seat 106. The key shape is sufficient to enable torque to be transmitted to the standoff fastener 100 through the head portion with a driver. The seat 106 of the standoff fastener 100 transmits lateral force from the driver to the standoff fastener 100. A large deep socket driver presses against the seat 106 parallel to the central axis 114 (in addition to rotational forces) and force the standoff fastener 100 into the corrugated metal subfloor.

A screw portion 108 with a lead end portion 110 is attached to the seat portion 106. The lead end portion 110 is designed to drill a hole into a corrugated metal subfloor, or may thread into a pre-existing hole. The screw portion 108 may have a variety of different kinds of threads, such as thread forming or thread cutting. Thread forming is understood to involve the displacement of material as a standoff fastener threads into a structure. Thread cutting is known remove material from the underlying metal sheet in order to thread into a structure.

A thread may extend the majority of a length of the standoff portion 116. The thread of the standoff portion 116 may be the same thread or a different thread as in the screw portion 108. The standoff portion 116 is not driven through underlying metal subfloor structure. Rather, the threading in the standoff portion 116 may accept an anchor nut to increase the surface area exposed to poured concrete.

Figure 2:
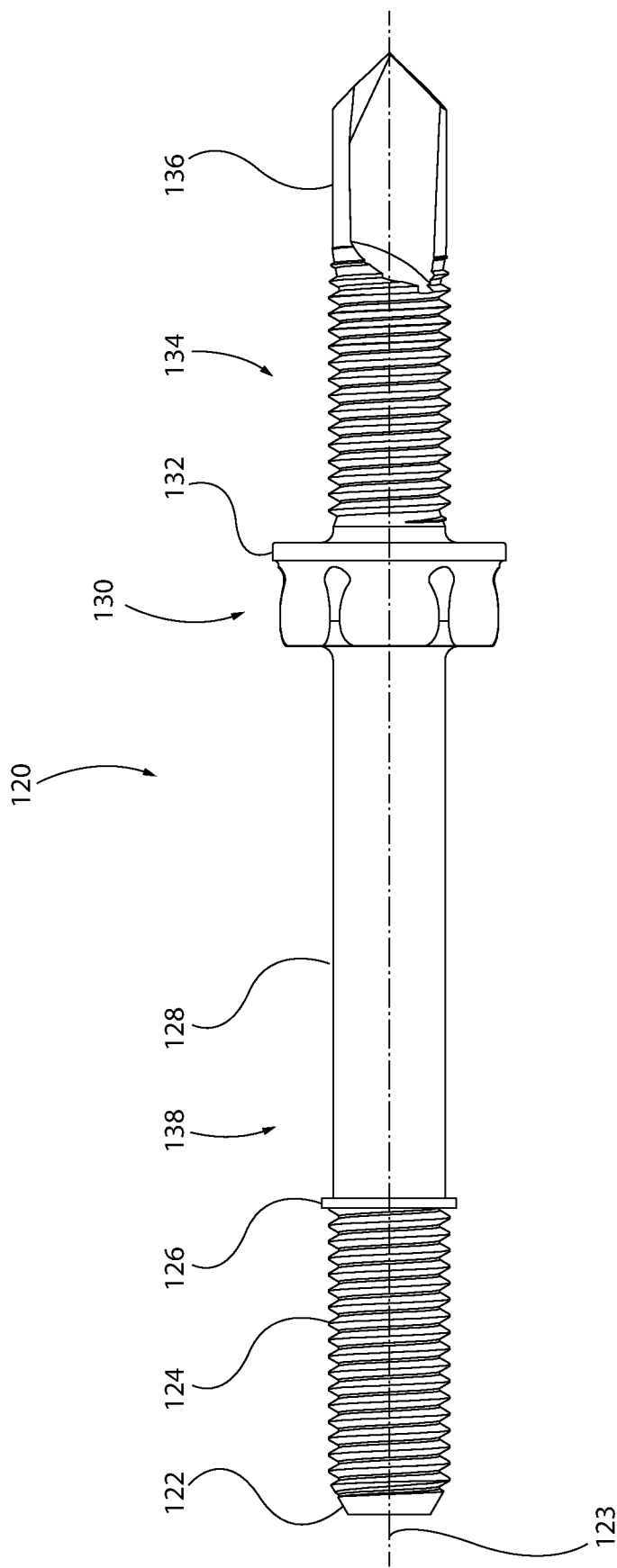
FIG. 2 is a side view of a fastener with a partially threaded standoff portion.

As shown in FIG. 2, a double threaded standoff fastener 120 has a standoff portion 138 with end portion 122, a threaded portion 124, a ring portion 126, and a shank portion 128. The threaded portion 124 may be designed to accept an anchor nut which has similar threads. The ring portion 126 prevents the anchor nut from rotating into the shank 128, and may engage and lock the anchor nut.

The head portion 130 may contain a seat 132, which is located adjacent to the screw portion 134 and lead end portion 136. The head portion may have a major and a minor diameter, measured perpendicular to the central axis 123 of the standoff fastener 120. The major diameter is the largest measurable diameter in the head portion, while the minor diameter is the smallest measurable diameter in the head portion. In some embodiments, the lead end 136 may be fluted. The major and minor diameter may also be as described in FIGS. 14A, 14B, and the accompanying text.

It is contemplated that the thread type of the threaded portion 124 may be of a different type of threading than the screw portion 134. For example, the threads of the threaded portion 124 could have a higher or lower thread count. In this embodiment, the threaded portion 124 would have a first thread type, and the screw portion 134 would have a second thread type. In some other embodiments, the threads may be of the same type.

Further, the threaded portion 124 may comprise only a portion of the length of the standoff portion 138. In some embodiments, the threaded portion 124 may extend from the end portion 122 down to 90% of the length of the standoff portion. Alternatively, the threaded portion may extend 90%, 80%, 70%, 60%, 50%, 40%, 30%, 20%, or 10% of the length of the standoff portion.

Figure 3:
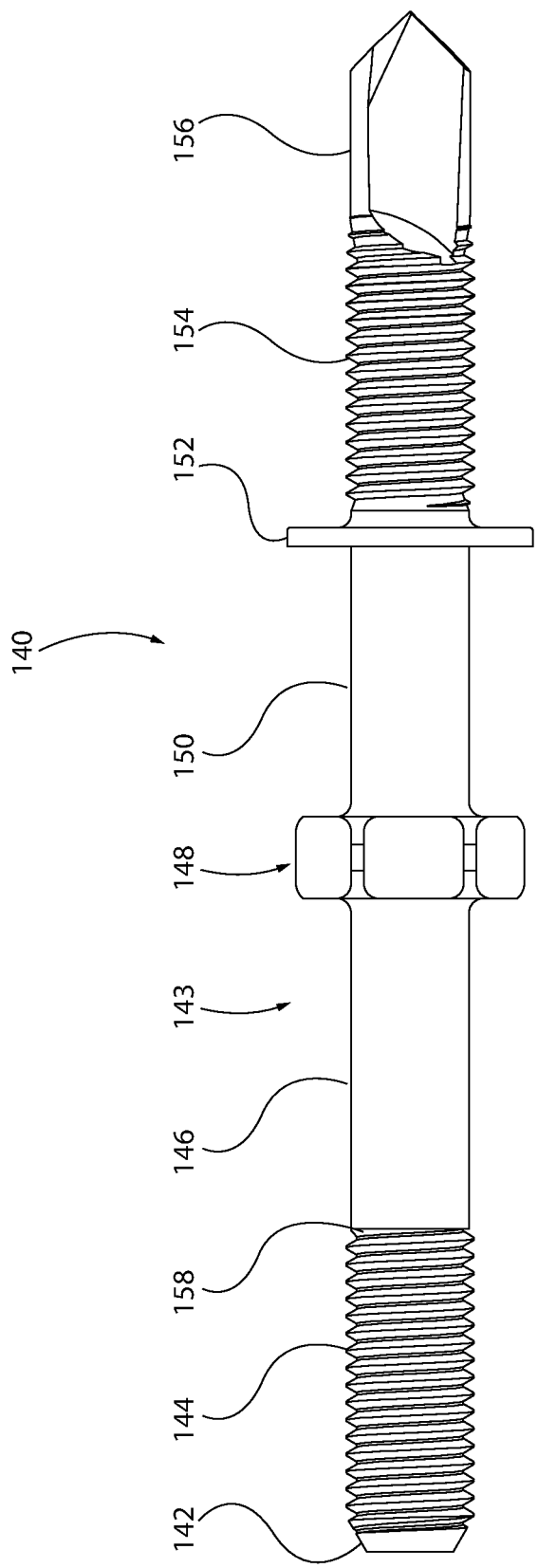
FIG. 3 is a side view of a fastener with a head portion in the center of two shank portions.

As shown in FIG. 3, a double threaded standoff fastener 140 may have a standoff portion 143 with a first shank portion 146 and a second shank portion 150. A head portion 148 having a key shape may be disposed between the first shank portion 146 and second shank portion 150. The standoff portion 143 may also have an end portion 142 and a runout 158 placed between a threaded portion 144 and first shank portion 146. In one embodiment, the seat 152 is separate from the head 148 and located between the second shank portion 150 and screw portion 154, which a lead end portion 156 attached to the screw portion 154.

The threaded portion 144 may have a first kind of thread, and the screw portion 154 may have a second kind of thread. In some embodiments, the thread located on the threaded portion 144 and screw portion 154 is the same. In other embodiments, they are different.

Figure 4:
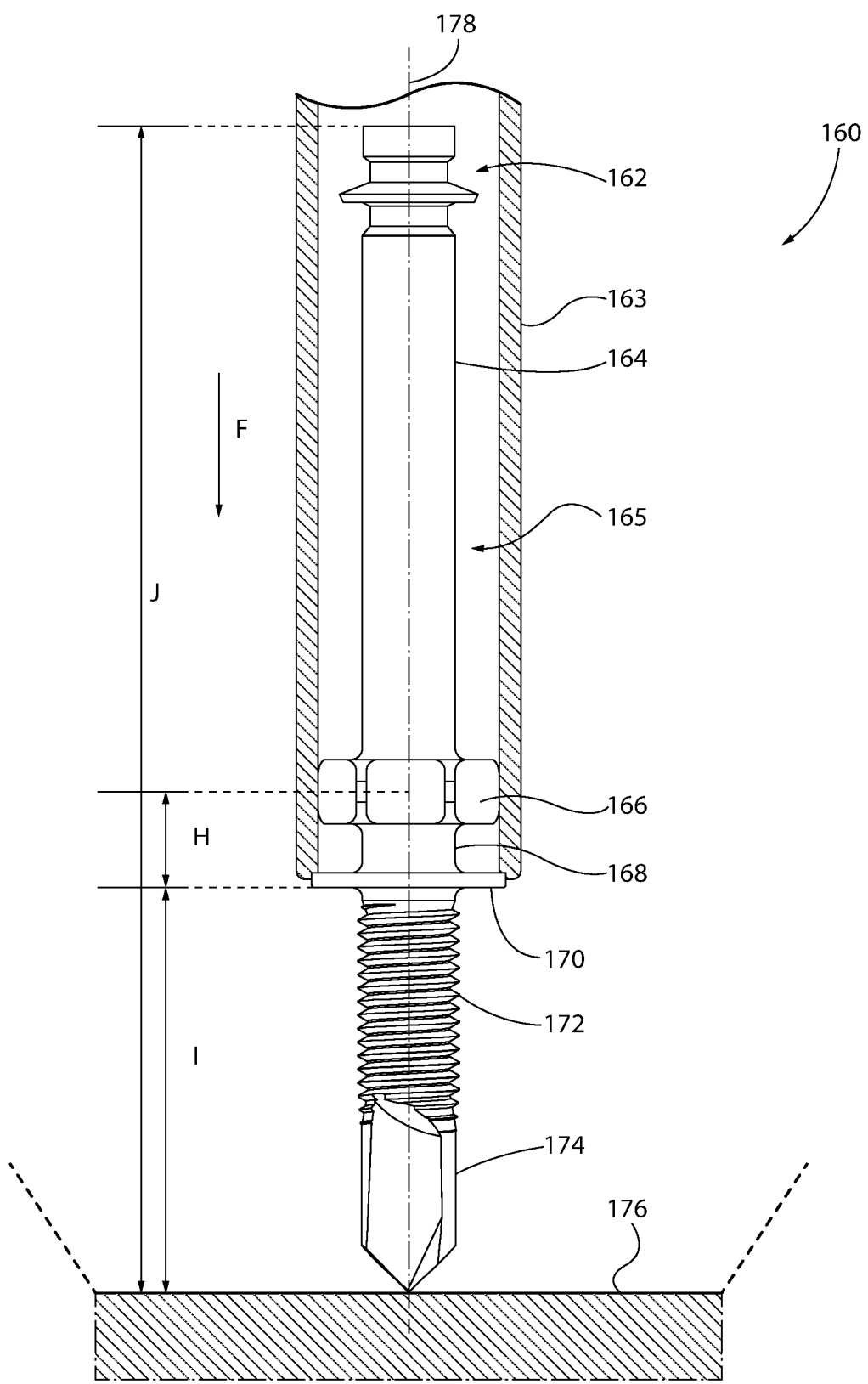
FIG. 4 is a side view of a standoff fastener engaged by a fastener.

As shown in FIG. 4, a threaded standoff fastener 160 is driven into a substrate 176 by a driver 163. The substrate 176 is preferably corrugated steel subfloor and the driver 163 is preferably a deep socket. The components of the standoff fastener 160 may be aligned on a drive axis 178.

The threaded standoff fastener 160 includes a standoff portion 165 which is located above the substrate 176 after the fastener 160 has been fastened. The standoff portion 165 may have a seat portion 170, and an anchor portion 162 having a diameter larger than a first shank portion 164 and second shank portion 168. A head portion 166 having a key shape and a major diameter greater than the anchor portion 162 is disposed between the first shank portion 164 and second shank portion 168. Below the standoff portion 165 is a threaded portion 172 and lead end 174.

The standoff fastener 160 has a total length "J" with the anchor portion 162 defining one end and the tip of the lead end 174 defining the other end. The seat portion 170 is disposed a distance "I" along the drive axis 178 measured from the tip of the fluted lead end 174. The head portion 166 is located a distance "H" away from the seat portion 170 along the drive axis 178.

Because the driver 163 applies a lateral force F on the seat 170, the distance I represents the lever arm of the fastener. Minimizing "I" will increase the amount of force F that can be applied to the fastener 160 without the fastener coming loose or slipping along the substrate 176.

The driver 163 applies a rotational torque through the head portion 166 while applying the lateral force F on the seat 170. The distance between where the rotational torque is applied relative to the lateral force F along the drive axis 178 is the distance H. As the value of H increases, the ability of the fastener to pivot within the driver 163 is decreased. Increasing the value of H will make the fastener easier to control.

Figure 5:
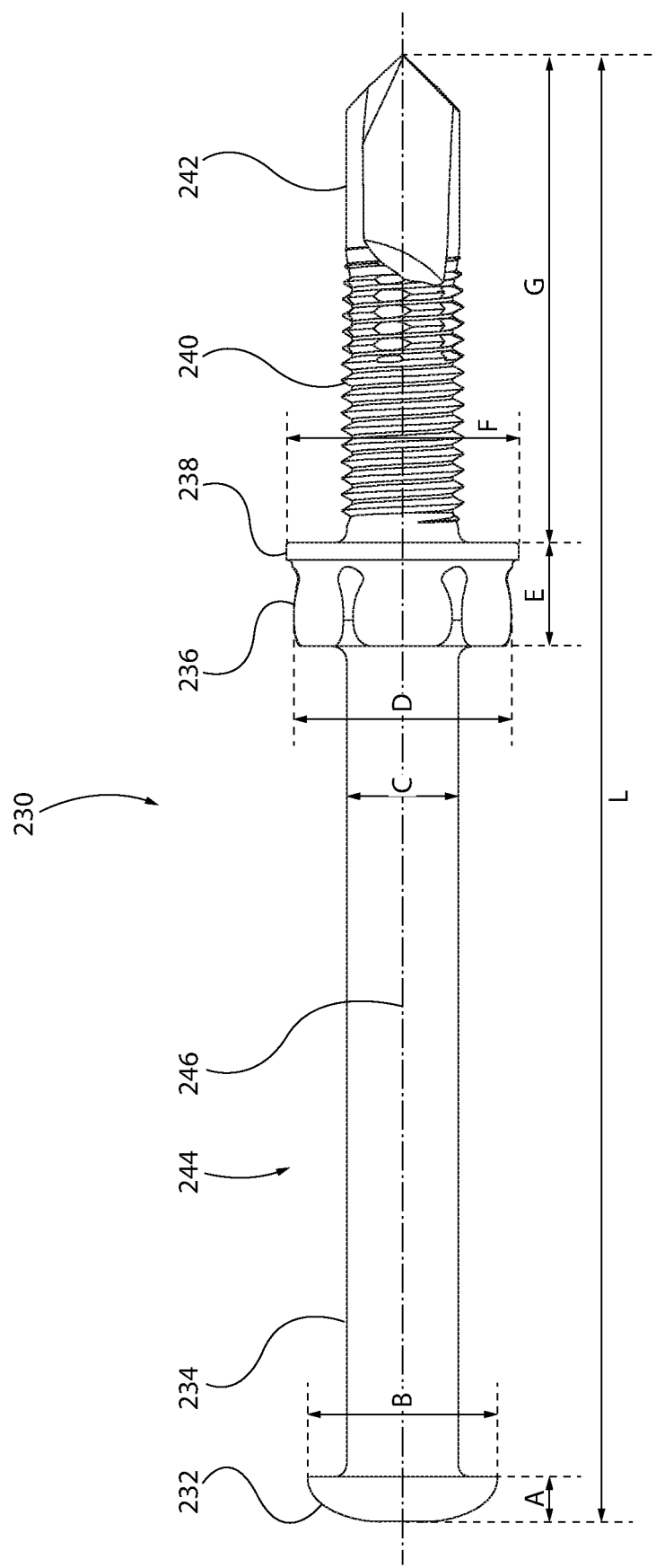
FIG. 5 is a side view of a dome shaped fastener.

FIG. 5 illustrates a standoff fastener 230 with a standoff portion 244, dome portion 232, shank portion 234, head portion 236, seat portion 238, screw portion 240, and lead end portion 242. The components of the standoff fastener 230 may be generally aligned on a drive axis 246.

The dome portion 232 has a diameter "B," the shank portion 234 has a diameter "C," the head portion 236 has a minor diameter "D," and the seat portion 238 has a diameter "F." The diameters may be measured in a direction perpendicular to the drive axis 246. In some embodiments, a socket driver fits over the dome portion 232 and shank portion 234 to engage with the key shape of the head portion 236. Since the socket driver is usually a straight tube, the diameter B must be of lesser or equal value to the diameter D. In a preferred embodiment, the diameter C is less than B, D, and F. The seat portion 238 is larger than the head portion 236 so it may accept a later force (or a force substantially parallel to the drive axis 246) from the socket driver. Accordingly, the diameter F may be larger than the diameter D.

The standoff fastener 230 has a total length L, measured along the drive axis 246 from the tip of the lead end 242 to the end of the dome portion 232. The dome portion 232 has a depth A, the head portion 236 and seat portion 238 have a combined depth E, and the threaded portion 240 and lead end portion 242 have a combined depth G.

Figure 6:
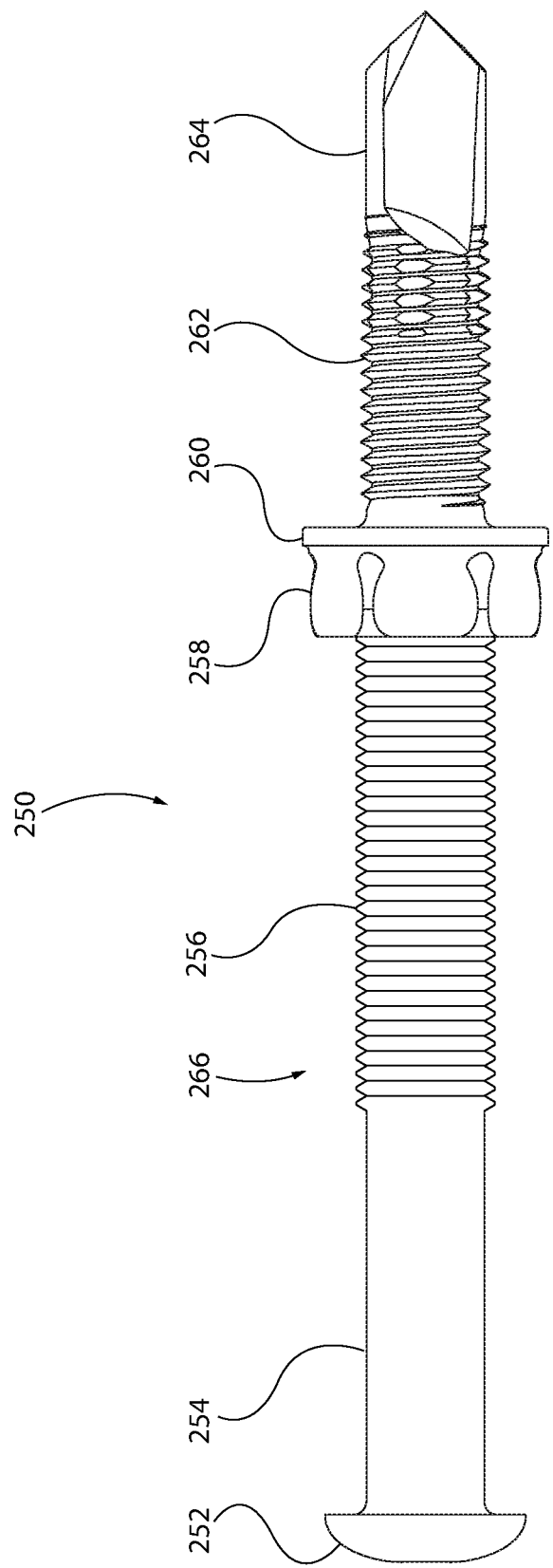
FIG. 6 is a side view of a ribbed standoff portion.

FIG. 6 illustrates a ribbed standoff fastener 250 with a standoff portion 266, dome end portion 252, shank portion 254, ribbed portion 256, head portion 258, seat portion 260, screw portion 262, and a lead end portion 264.

The ribbed portion 256 contains a plurality of ribs or raised ridges which are parallel to one another. They function to increase the surface area of the standoff structure located between the dome end portion 252 and the head portion 258. The increased surface area effectively grips a poured and hardened concretious material and will make the standoff fastener resist motion while inside the hardened concrete. The ribbing is not threaded, meaning that a nut or other member cannot be rotationally fastened onto the ribbed portion 256.

Figure 7:
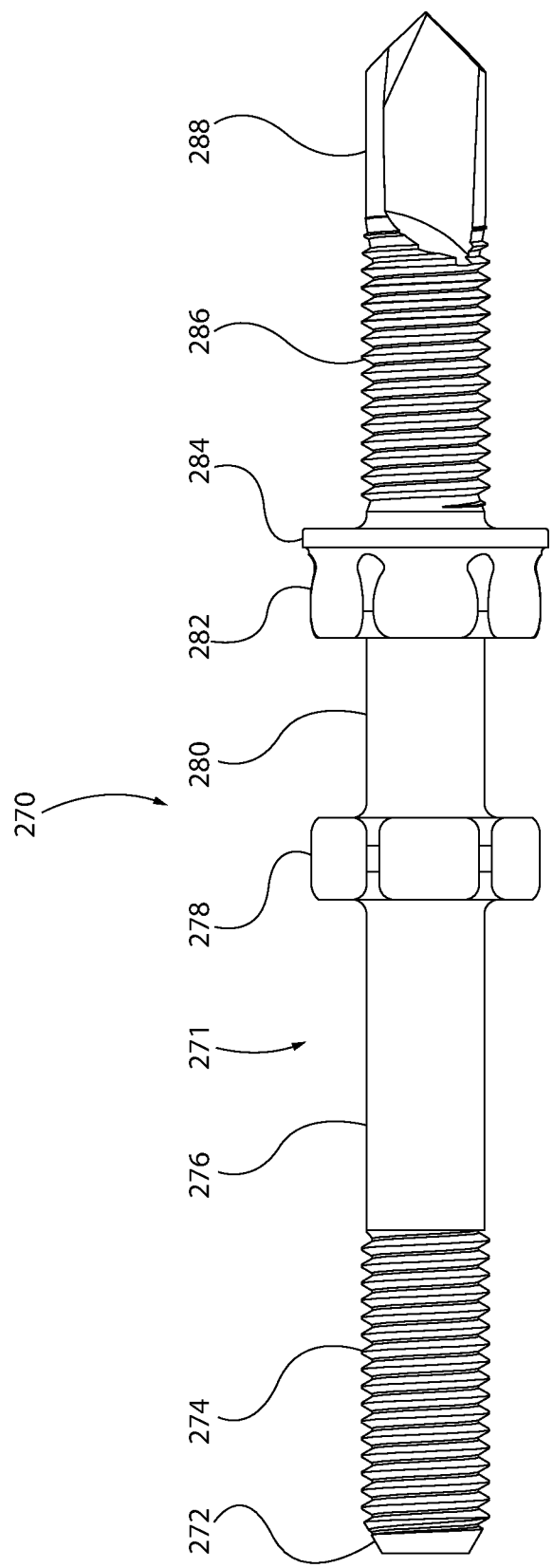
FIG. 7 is a side view of a multi-head standoff fastener.

FIG. 7 illustrates a doubled threaded standoff fastener 270, having a standoff portion 271, end portion 272, first thread end 274, a first shank portion 276, first head portion 278, second shank portion 280, second head portion 282, a seat 284, a second thread end 286, and a lead end 288.

The standoff fastener 270 can accept a driver of at least two different sizes by virtue of the separate head portions. The first head portion 278 has a smaller major diameter than the second head portion 282. While both head portions are illustrated with a hex key shape, it is contemplated that the head portions could include a variety of key shapes. Since the first head portion 278 has a larger diameter than the second shank portion 280, the first head portion 278 may also act as anchor portion enabling the fastener to resist lateral movement when encased in a hardened concrete.

Figure 8:
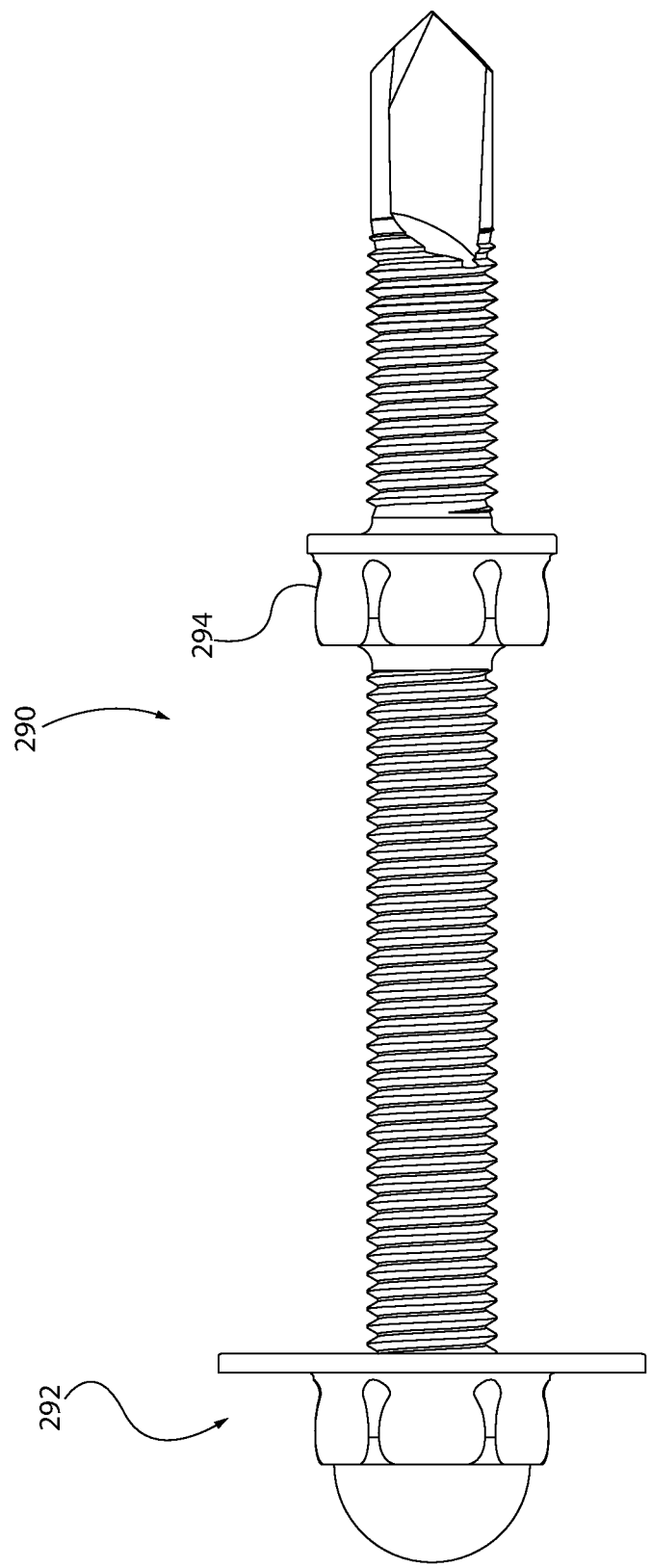
FIG. 8 is a side view of an anchor nut attached to a double threaded fastener.

FIG. 8 illustrates an assembly 290 of an anchor nut 292 threaded onto a double threaded fastener 294. In this assembled configuration, a socket driver would be unable to engage with the head portion of the fastener 294 by virtue of the larger diameter of the anchor nut. By placing the anchor nut onto the fastener after it has been fastened into a corrugated metal subfloor, the anchor portion of a fastener can have a diameter much larger and unbounded by the diameter of the head portion. This embodiment still retains the advantages of locating the head portion within the interior of the fastener as whole, such as increased lateral force and control.

Figure 9:
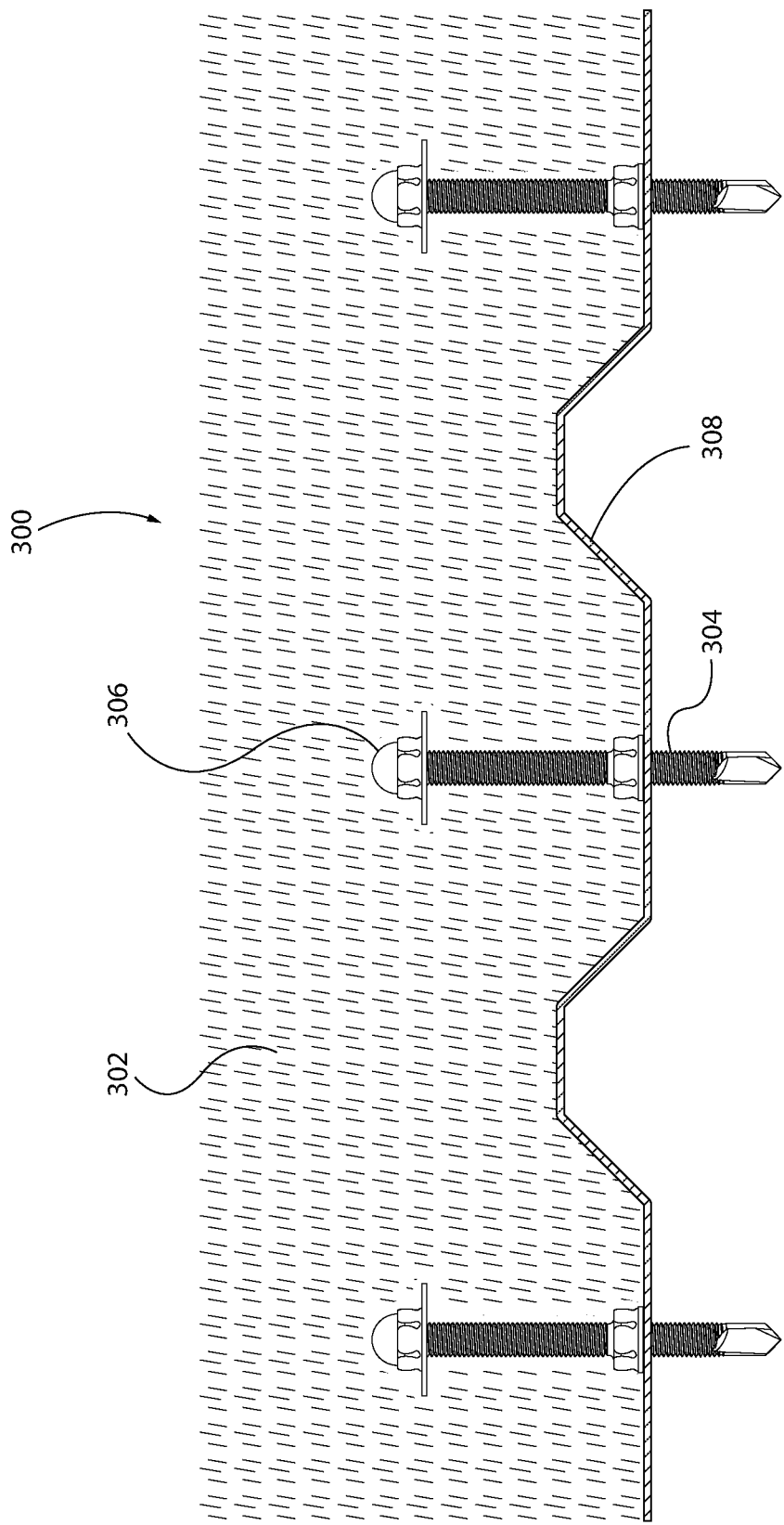
FIG. 9 is a cutaway view of an embodiment encased in a building material.
Figure 13A:
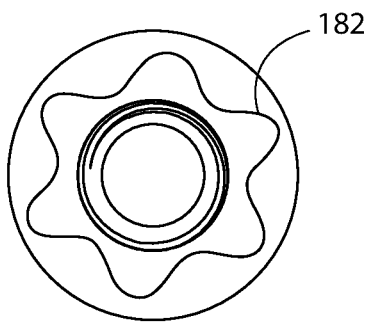
FIGS. 13A-13G are top views of various key shapes.
Figure 13B:
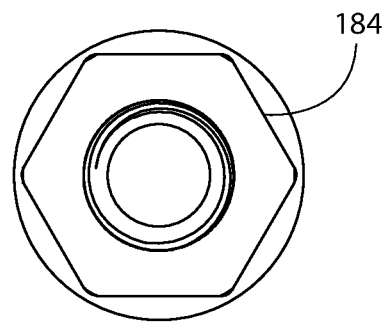
Figure 13C:
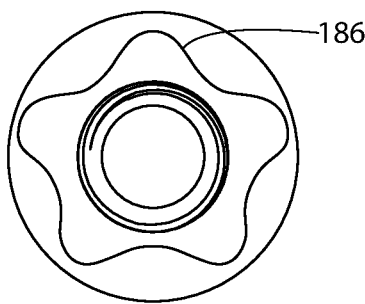
Figure 13D:
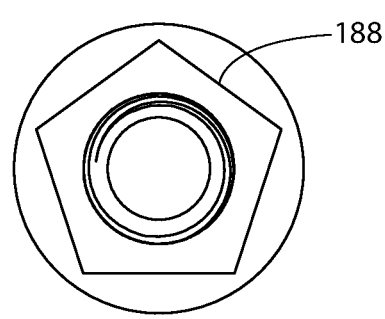
Figure 13E:
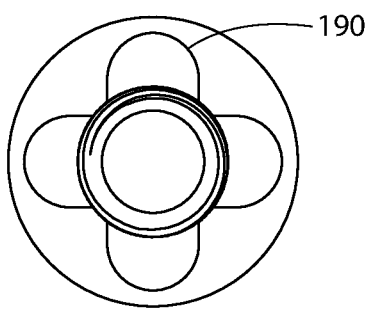
Figure 13F:
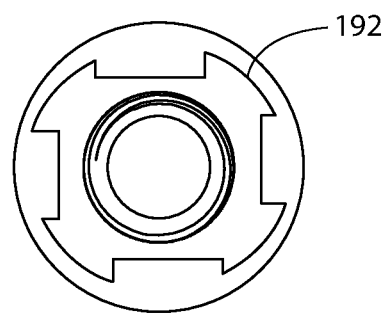
Figure 13G:
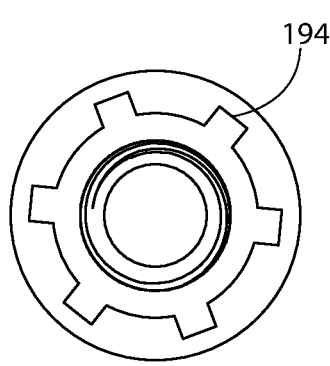

FIG. 9 illustrates a floor assembly 300, having a plurality of standoff fasteners 304 fastened into steel subfloor 308, each fastener having an anchor nut 306. The standoff fasteners and anchor nuts are encapsulated by a cementious material.

FIGS. 10A and 10B illustrate an anchor nut 200 with a cap 202, a head portion 204 having a key shape, and disc portion 206. The disc portion 206 has a diameter which is substantially greater than the diameter of the head portion 204.

FIGS. 11A and 11B illustrate an anchor nut 210 with a cap 212, head portion 214, and seat portion 216. The seat portion 216 has a diameter which is greater than or equal to a diameter of the head portion 214, and is in some embodiments circular in shape. It is contemplated than an anchor nut could take many forms, as long as the nut has a diameter greater than the shank portion and threading designed to attach to the standoff fastener.

FIGS. 12A and 12B illustrates an anchor nut 220 with a head portion 222 having a key shape and a seat portion 224, which a central hole 226 with a thread form inside.

As shown generally in FIGS. 13A-13G, a head portion of the instant fastener may be of a variety of key shapes, such as hexalobular 182 (i.e. five lobes), hexagonal 184 (i.e. six sides), pentalobular 186 (i.e. five lobes), pentagonal 188 (i.e., five sides), quadralobular 190 (i.e., four lobes), quadraspinular 192 (i.e., four splines), or hexaspinular 194 (i.e. five splines). It is contemplated that at least these general key shapes are appropriate for both the standoff fasteners and the anchor nuts of the present disclosure. While the disclosure illustrates fasteners using the hexagonal key shape, a person of ordinary skill in the art understands that the key shape can be any shape desired.

Figure 14A:
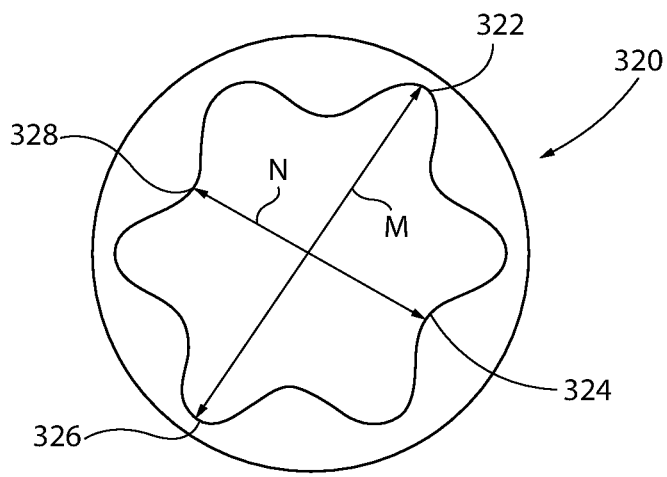
FIGS. 14A-14C are top views of key shapes and their major and minor diameters.
Figure 14B:
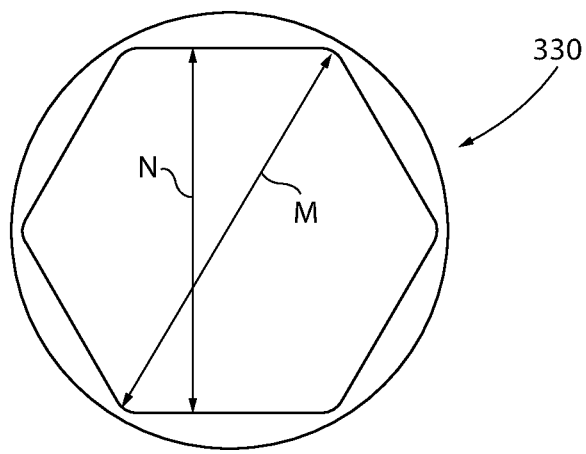
Figure 14C:
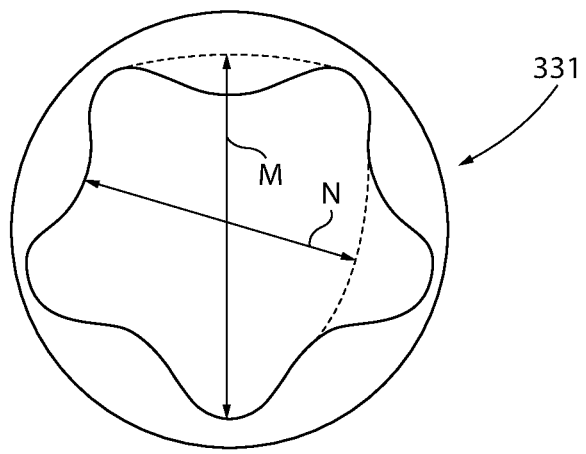

By way of illustration, a selection of fastener recesses are illustrated in FIGS. 14A-14C. The fastener socket recess shown in FIG. 14A is a hexalobular socket 320 appropriate for use with the hexalobular key 182 of FIG. 13A. Alternatively, the fastener socket recess shown in FIG. 14B is a hexagonal shape 330 appropriate for use with the hexagonal key 184 or Allen key of FIG. 13B. The fastener socket recess shown in FIG. 14C is a pentalobular socket 331 appropriate for use with the pentalobular key 186 shown in FIG. 13C. As will be apparent, each key shape fits one or more socket recesses in desired fasteners.

In any case, the fastener socket recess has a major dimension M and a minor dimension N as shown in FIG. 14A. The major dimension M is the dimension of the socket extending between opposing lobes 326, 322 on the hexalobular socket illustrated. The minor dimension N is the dimension of the socket extending between opposing spaces or antilobes 328, 324 between the lobes.

More generally, the major dimension of a fastener may be defined as the diameter of a circle centered on the longitudinal axis of the fastener and having a radius extending from the longitudinal axis to a point on the perimeter of the socket recess furthest from the longitudinal axis of the fastener. The minor dimension may be defined as the diameter of a circle centered on the longitudinal axis of the fastener and having a radius extending from the longitudinal axis to a point on the perimeter of the socket closest to the longitudinal axis of the fastener. By way of illustration, the hexagonal socket recess 330 has a major dimension M and a minor dimension N as shown in FIG. 14B. A pentalobular socket 331 has a major dimension M and a minor dimension N as shown in FIG. 14C. It is contemplated that the manner in which M and N are measured would apply to any key shape, regardless if the key shape is represented in a negatively oriented recess or positively oriented drive head.

Figure 15:
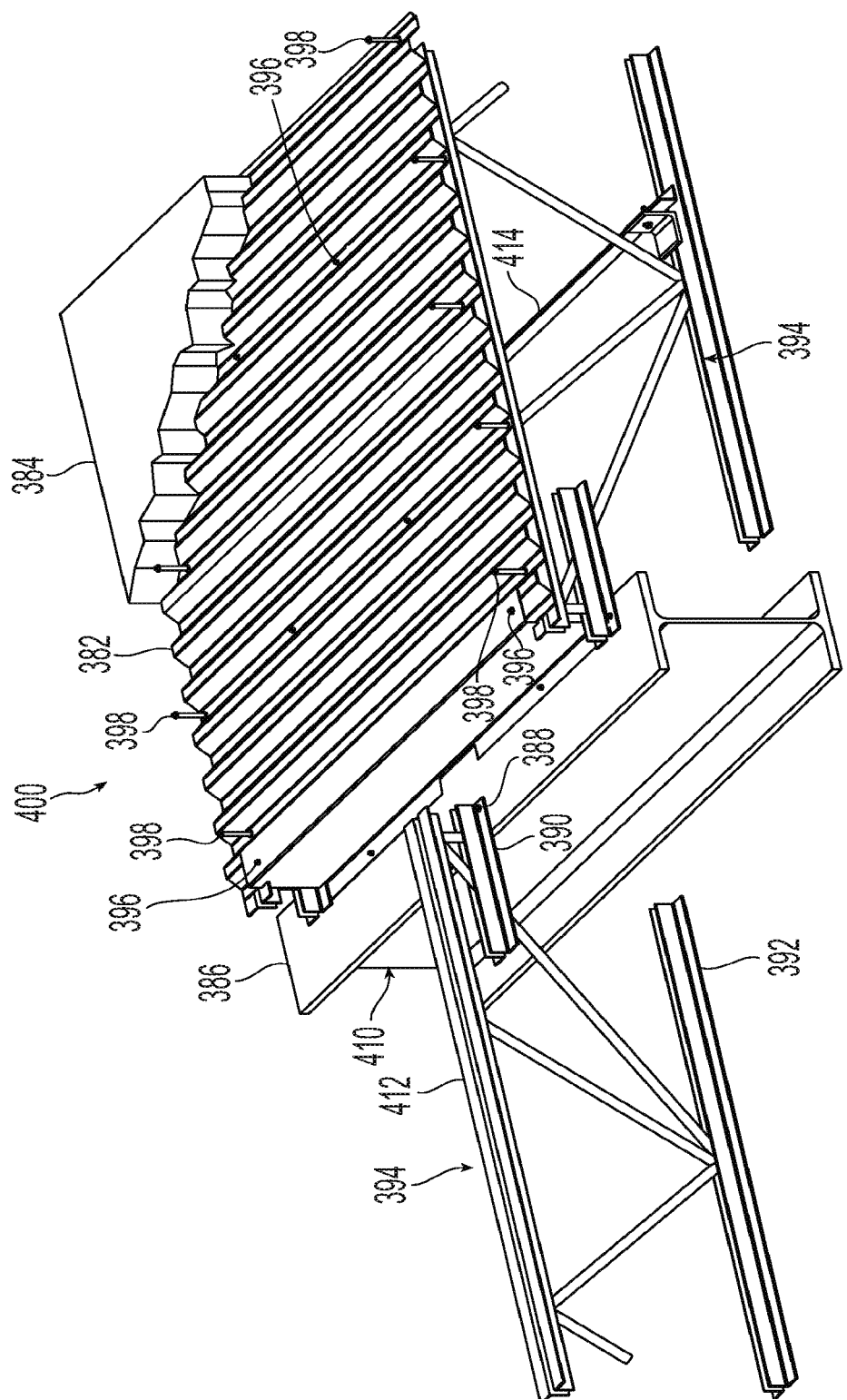
FIG. 15 is a partial prospective view of a floor joist system of the present disclosure.
Figure 16:
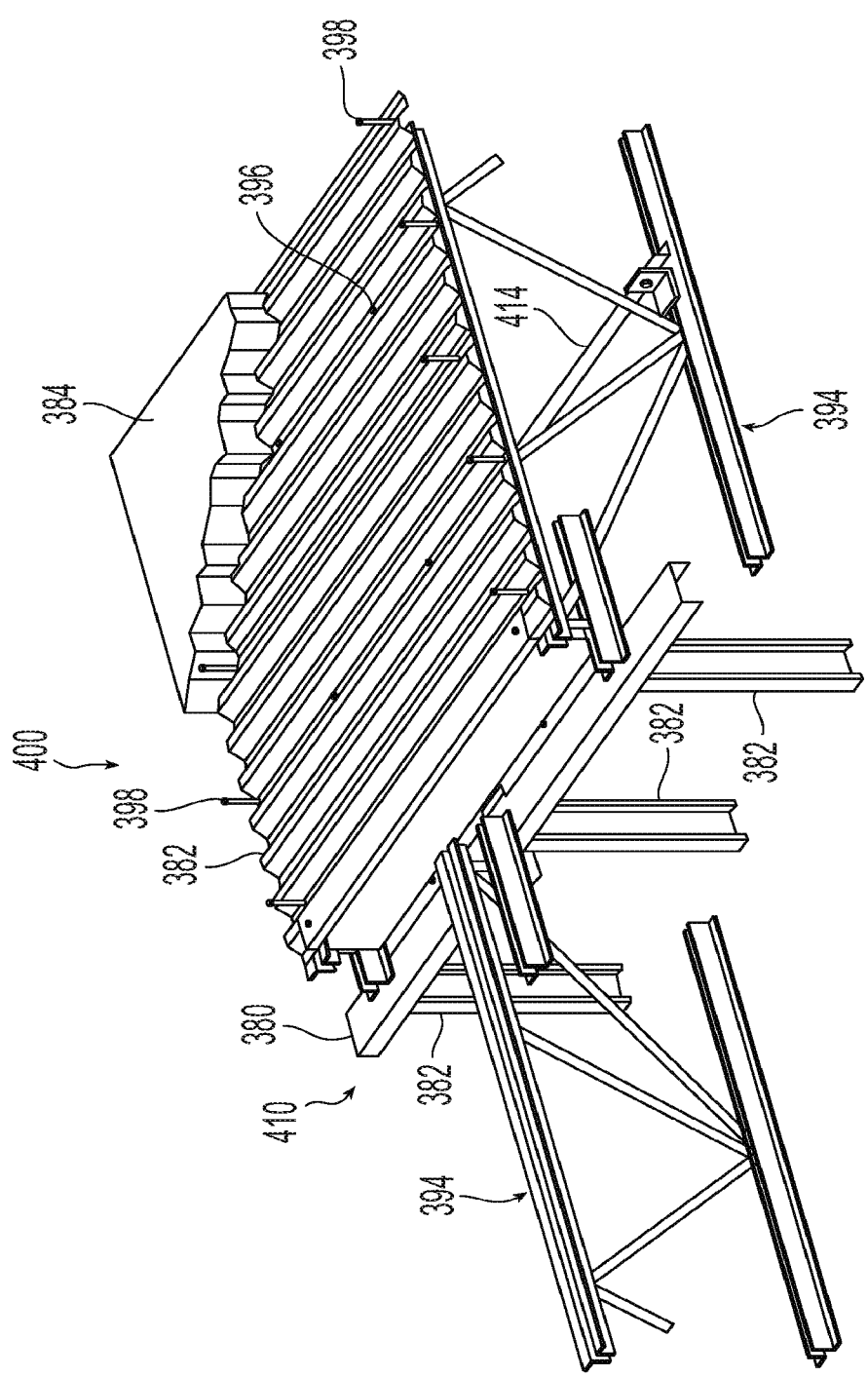
FIG. 16 is a partial prospective view of an alternative embodiment of the floor joist system of FIG. 15.

Turning now to FIGS. 15 and 16, a building structure may include a floor joist system 400 and at least one load and typically two or more bearing member 410. The floor joist system 400 may comprise a plurality of joists 394 transverse to the load bearing member 410 spaced between load bearing members 410, and supporting a steel deck 382. The steel deck 382 is typically made of side-by-side corrugated member, covered by a concrete slab 384. The load bearing member 410 may include a girder 386 as shown in FIG. 15. Alternatively, the load bearing member 410 may be a load bearing wall 380 comprising a plurality of studs 382 as shown in FIG. 16. The load bearing member may comprise other structural members as desired to support the floor joist system 400.

Various building members in the building structure may be connected together and secured by a plurality of thread-forming fasteners 388 such as shown in FIG. 17A, or by a plurality of self-drilling, thread-forming fastener 362 such as shown in FIG. 18A, or by a plurality of case hardened thread-forming self-drilling fasteners such as shown in FIG. 19A. For example, a first steel building member, such as a joist 394, may be connected to a second steel building member, such as the load bearing member 410, by a plurality of the thread-forming fasteners 388, or by a plurality of the self-drilling, thread-forming fastener 362.

Each thread-forming fastener 388 is a fastener of steel having a tapered lead portion 346 tapering at an angle in a range from 30° to 60° of at least Rockwell C-Scale hardness (HRC) 50 induction hardness adapted to start into a pilot hole 378, which may be pre-drilled, pre-punched or otherwise formed, in at least the second steel building member, such as shown in FIGS. 31A, 31B, 32A, and 32B. The thread-forming fastener 388 includes a thread-forming portion 350 of at least HRC 50 hardness adapted to thread the fastener 388 into at least the second building member, and a threaded portion 348 adjacent the thread-forming portion 350. As used in the specification herein and the appended claims, the word adjacent means either adjoining or nearby; as used herein adjacent features may or may not be contiguous. The thread-forming fastener 388 has a head 354 capable of clamping the first steel building member to the second steel building member with the fastener 388 installed. The threaded portion 348 has a major diameter 342, i.e. the diameter of the fastener at the tip of the thread, and a minor diameter 340, i.e. the diameter of the fastener at the root of the thread, as shown in FIG. 17C. The fastener 388 has a desired thread pitch 344, i.e. the distance from one thread tip to the adjacent thread tip along the length of the fastener, as shown in FIG. 15C.

At least a portion of the threaded portion 348 of the thread-forming fasteners 388 adjacent the head 354 may have a hardness between about Rockwell B-Scale hardness (HRB) 70 and HRC 40. In one alternative, at least a portion of the threaded portion 348 has a through hardness between about HRC 25 and HRC 34. In one alternative, at least a portion of the threaded portion 348 has a through hardness between about HRB 70 and HRB 100. In one alternative, at least a portion of the threaded portion 348 has a through hardness between about HRC 19 and HRC 30. In one alternative, at least a portion of the threaded portion 348 has a through hardness between about HRC 26 and HRC 36. In yet another alternative, at least a portion of the threaded portion 348 has a through hardness between about HRC 33 and HRC 39. The hardness of at least a portion of the threaded portion 348 may be selected to comply with ASTM A307, ASTM A325, ASTM A354, ASTM A490 or other fastener standard. Alternatively or in addition, the hardness of at least a portion of the threaded portion 348 may be selected to comply with SAE J429 Grade 2, SAE J429 Grade 5, and SAE J429 Grade 8, or other fastener standard. Adjacent the threaded portion 348, the thread-forming portion 350 may have a hardness greater than about HRC 50, and may be greater than about HRC 54. Up to five threads between the threaded portion 348 and the thread-forming portion 350 may be hardened to at least HRC 50 or at least HRC 54, and at least a majority of the threaded portion 348 of the thread-forming fasteners 388 is through-hardened such that the fastener is ductile through the threaded portion. As the thread-forming fastener 388 is installed connecting a first steel building member and a second steel building member, the fastener 388 may be tightened to clamp the first member between the head 354 and the formed threads in the second building member. As the thread-forming fastener 388 is tightened, a portion of the ductile threaded portion 348 between the head 354 and the threads engaging the second building member elongates providing a clamping load on the connection according to design requirements. In the past, thread-forming fasteners had case hardened threads that could not elongate in clamping without risk of fracture or hydrogen embrittlement. The present thread-forming fasteners 388 have sufficient ductility for structural connections such as slip-critical connections in which the materials joined are clamped together without slippage by the tension induced in the fasteners.

The thread-forming fastener 388 may have a major diameter between about ¼ inch, or smaller, and 1½ inch, or larger. In a connection of first and second steel building members, the first steel building member may have a clearance hole 380 having a diameter larger than the major diameter of the fastener 388. The second steel building member has the pilot hole 378 aligned with the clearance hole in the first member, the pilot hole being smaller than the major diameter of the fastener 388, and typically larger than the minor diameter, although for thin metal applications, such as thinner than 14 gage, or less than 16 gage, the pilot hole may be smaller than the minor diameter. The pre-drilled or pre-punched pilot holes 378 in the second steel building member may be adapted to installing thread-forming fasteners 388, the pilot holes 378 having a bore diameter between about 70% and 98% of the major diameter 342. Alternatively, the pilot hole bore diameters for installing the thread-forming fasteners 388 may be between about 80% and 98% of the major diameter 342, and alternatively between about 80% and 95% of the major diameter. The diameter of the pilot hole may be selected based on the thickness of the second building member, the major diameter of the fastener, and the desired thread-forming torque. The thread-forming fastener 388 is installed through the clearance hole 380 and rotated into the pilot hole 378. The thread-forming portion 350 forms threads in the bore of the pilot hole for the threaded portion 348 to engage the second member. The thread-forming fastener 388 is tightened to clamp the first member between the head 354 and the formed threads in the second member. Alternatively, the first and second members are both provided with pilot holes and the thread-forming portion 350 forms threads in the bore of the pilot holes in both the first and second members for the threaded portion 348 to engage the first and the second member. Optionally, the thread-forming fastener 388 may include an unthreaded shank portion between the head 354 and the threaded portion 348 as desired for the connection. If provided, the length of an unthreaded shank portion and the axial length of the threaded portion 348 may be selected according to the thickness of the first and second building members and desired length of thread engagement. For example, in certain bearing-type connections with threads excluded from the shear plane, an unthreaded shank portion may be desired having a length greater than the thickness of the first building member such that the threaded portion 348 engages the second building member clamping the first building member between the head 354 and the threads engaging the second building member. In any case, the threaded engagement with the first and/or second building member acts as a nut, and in certain applications, no nut may be required based on design requirements. Examples of various configurations of installation of thread-forming fasteners 388 clearance holes and pilot holes are disclosed in applications described herein, and each application disclosed is not limited to the configuration described.

Figure 23:
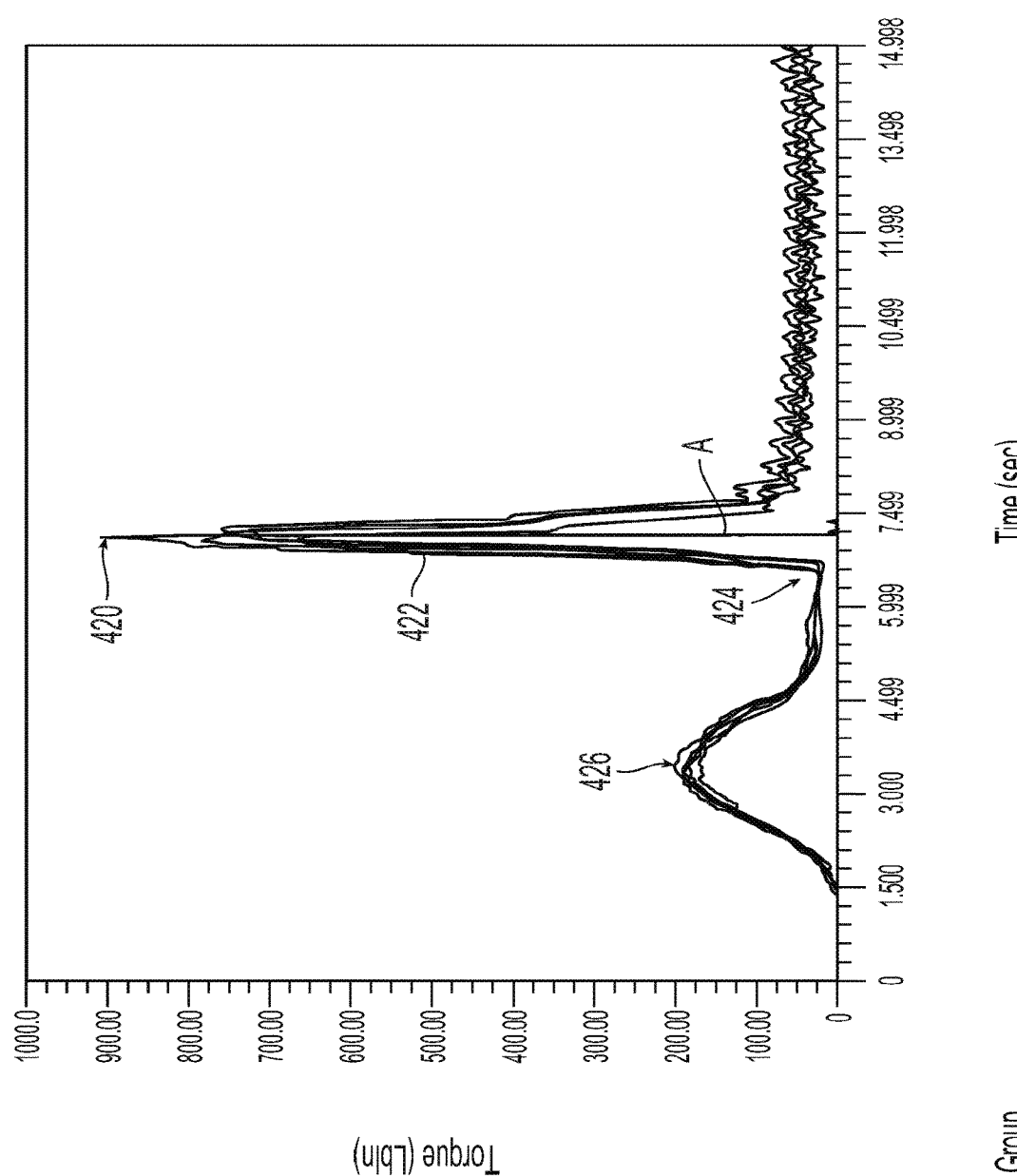
FIG. 23 is a graph of torque over time during installation representing the thread-forming fastener of FIG. 17A installed in a steel sheet having a thickness of about 0.25 inch.

Shown in the graph of FIG. 23 is the installation torque over time for 5 test samples of the self-drilling, thread-forming fastener 362 identified as manufacturer's samples 360-80901-60, representative of the thread-forming portion and threaded portion of the thread-forming fastener 388 having a major diameter of ⅜ inch installed into a pilot hole at 175 revolutions per minute into a ¼ inch thick plate. As the thread-forming fastener 388 is driven into the pilot hole in the ¼ inch thick plate, a thread-forming torque 426 is the largest torque used to rotate the thread-forming portion 350 of the thread-forming fastener 388 into the pilot hole 378 forming threads in the pilot hole. After the head 354 makes contact with the first building member, further rotation advances the threaded portion 348 into the threaded fastener opening with increasing torque as the head clamps the members against the threads formed in the second member. The operator stops tightening the fastener at a seating torque 422 as desired lower than the failure torque 420. The drive torque 424 is the torque right before the torque rise to seating, as shown in FIG. 23. Continued rotation of the fastener may further increase the torque needed to turn the fastener until the bolted connection fails at the failure torque 420. The failure mode typically is determined by the thickness of the building members and the major diameter 342 of the fastener. When the building member in which threads are formed is a thin material such as less than 14 gage, or less than 16 gage, the material of the building member may deform or fracture and the fastener strip-out at a strip torque. Failure torque 420 generally refers to strip torque in building members of thinner thickness. For certain material thicknesses, the fastener will fracture at the failure torque 420.

The installation torque over time for the thread-forming fastener 388 was measured using self-drilling, thread-forming fasteners 362 installed in a pre-drilled pilot hole to negate effects of the fluted lead portion. Five samples having a major diameter of ⅜ inch were installed at 175 revolutions per minute into pilot holes in a steel member having a thickness of about 0.25 inch and plotted in the graph of FIG. 23. The thread-forming torque 426 as shown in the graph of FIG. 23 is less than about 200 inch-pounds. The drive torque 424, before the torque rises to seating, is less than about 25 inch-pounds. The failure torque 420 is greater than 343.94 inch-pounds. For certain samples, the failure torque is greater than 700 inch-pounds, and one sample greater than about 900 inch-pounds. The failure torque 420 shown in FIG. 23 is a strip torque for 4 of the 5 samples. The trace identified as "A" in FIG. 23 shows a drop to 0 inch-pounds after reaching the failure torque because fastener A fractured at the failure torque. The ratio of failure torque to thread-forming torque is at least 3.0, and the ratio of failure torque to drive torque may be greater than 6.0 when the steel member has a thickness of 0.25 inch (about 6.35 millimeter) and the pilot hole having at least one diameter within nominal diameter between 85 and 90% of major diameter. Alternatively, the ratio of failure torque to drive torque may be greater than 10, and may be greater than 20. The ratio of failure torque to drive torque may be as high as 50 to 100, or more, when the second building member having a thickness of 0.25 inch and the pilot hole having at least one diameter within nominal diameter between 80 and 98% of major diameter.

Figure 24:
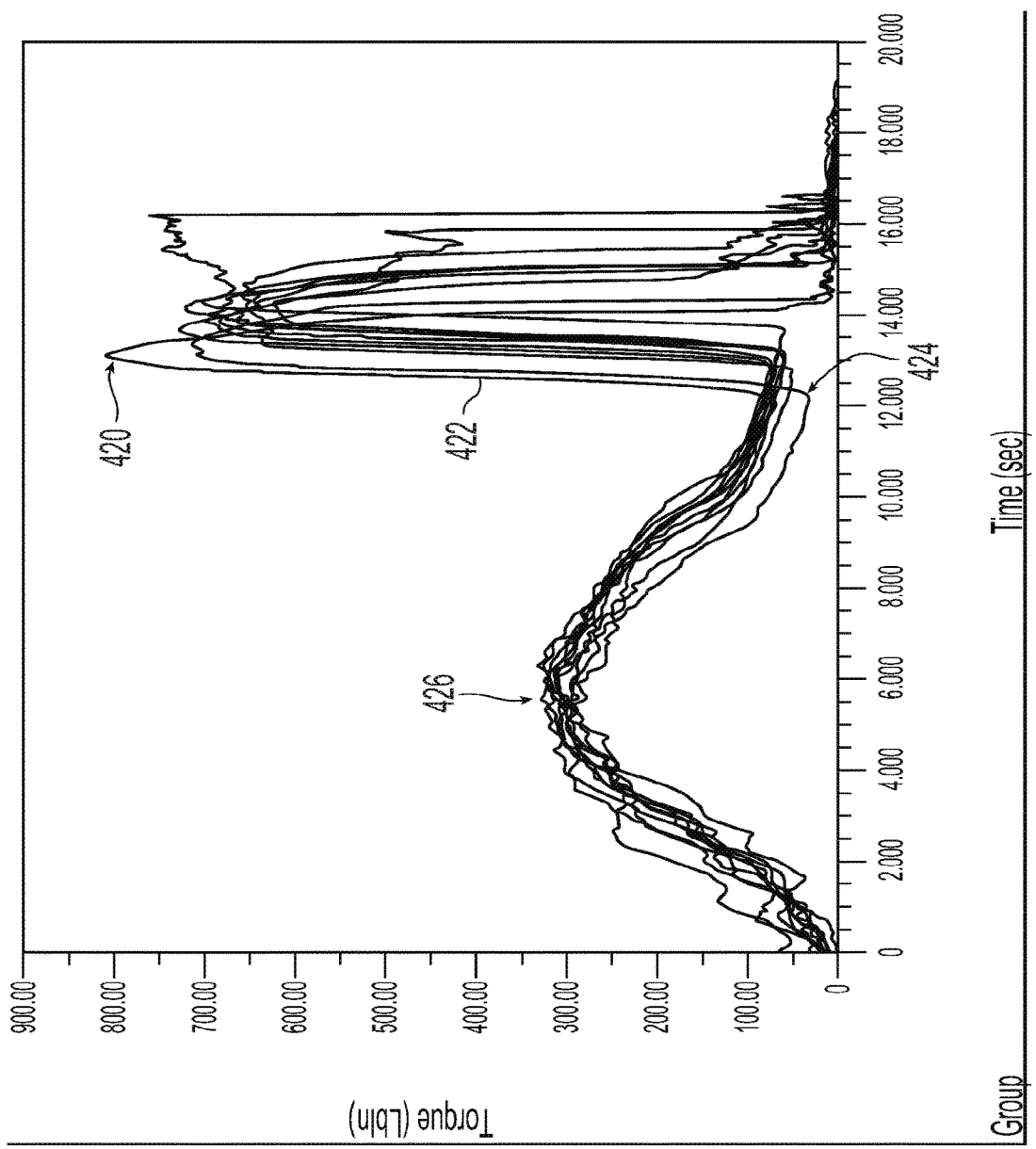
FIG. 24 is a graph of torque over time during installation representing alternative thread-forming fasteners of FIG. 17A installed in a steel sheet having a thickness of about 0.25 inch.

Further testing of ⅜ inch major diameter thread-forming fasteners 388 is shown in FIG. 24. As with the experiment shown in FIG. 23, the installation torque over time for the thread-forming fastener 388 was measured using ten samples of self-drilling, thread-forming fasteners 362, identified as manufacturer's samples 360-80952-60 having a major diameter of ⅜ inch, installed in pre-drilled pilot holes to negate effects of the fluted lead portion. The samples were installed at 175 revolutions per minute into 0.302 inch diameter pilot holes in a steel member having a thickness of about 0.25 inch and plotted in the graph of FIG. 24. In this test sample, the average thread-forming torque 426 of the samples was 316.6 inch-pounds. As shown in the graph of FIG. 24, the thread-forming torque is less than about 350 inch-pounds. The drive torque 424, before the torque rises to seating, is less than about 100 inch-pounds. The failure torque 420 is greater than 600 inch-pounds. For certain samples, the failure torque is greater than 700 inch-pounds, and one sample greater than 800 inch-pounds.

Figure 25:
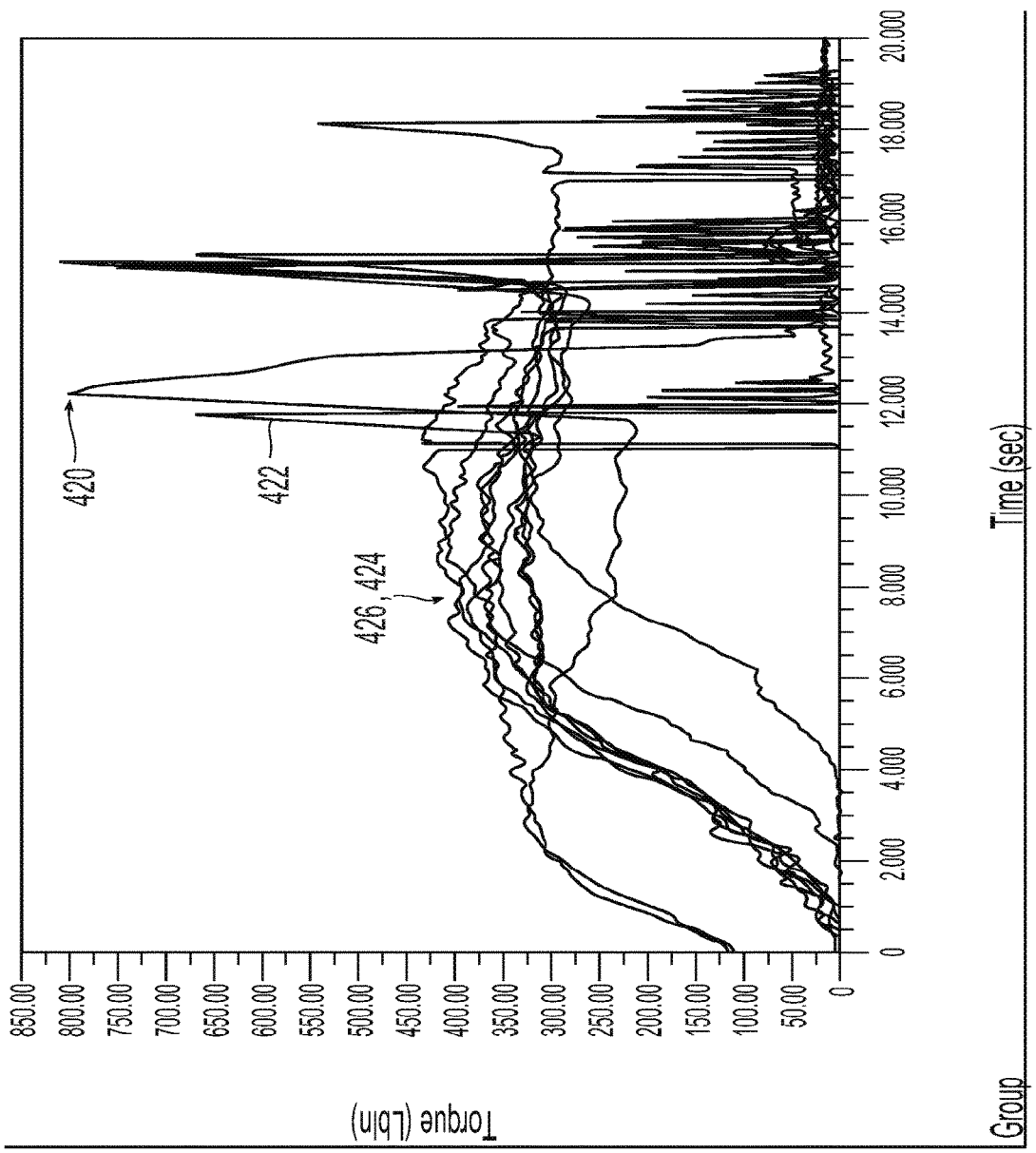
FIG. 25 is a graph of torque over time during installation for a comparative self-drilling fastener installed in a steel sheet having a thickness of about 0.25 inch.

FIG. 25 shows installation torque over time for comparative samples of prior ⅜ inch fasteners. The comparative fasteners lacked the present thread-forming portion, instead utilizing prior technology. The graph of FIG. 25 shows the higher thread-forming torque required to drive the prior fasteners. The average thread-forming torque of the ten samples was 373.4 inch-pounds. Additionally, the drive torque is significantly higher than the present fasteners as shown in FIG. 24. The drive torque for the comparative fastener samples is greater than 200 inch-pounds, and for most samples is greater than 250 inch-pounds. The ratio of failure torque to drive torque for the comparative fasteners is less than 4. Additionally, as shown by the graph of FIG. 25 and TABLE 1, the variation in performance among the comparative samples was much higher than the present fastener as shown by the standard deviation of the data.

TABLE 1

| | Mean Thread-Forming Torque (in-lbs) | Standard Deviation Thread-Forming Torque | Mean Failure Torque (in-lbs) | Standard Deviation Failure Torque |
|---|---|---|---|---|
| Present disclosure, FIG. 24 | 316.6 | 9.8 | 708.1 | 53.4 |
| Comparative sample, FIG. 25 | 373.4 | 37.5 | 685.1 | 136.1 |

The consistent performance of the present fastener provides better predictability. In certain applications, additional prior fasteners were added to accommodate the inconsistent performance of the prior fasteners. In these applications, the improved performance and decreased variation of the present fasteners 388 may allow a fewer number of fasteners to be used to provide the desired design requirement at an increased efficiency.

Figure 17D:
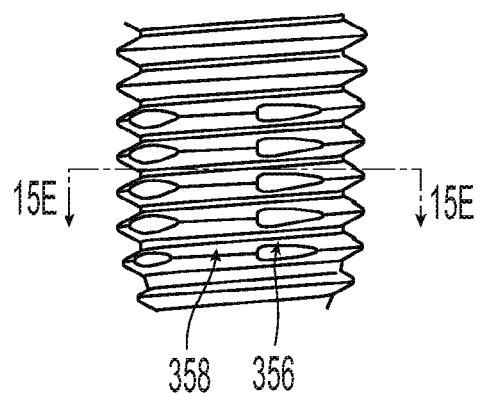
FIGS. 17D-17E illustrate alternative thread-forming portions of the fastener of FIG. 17A.
Figure 17E:
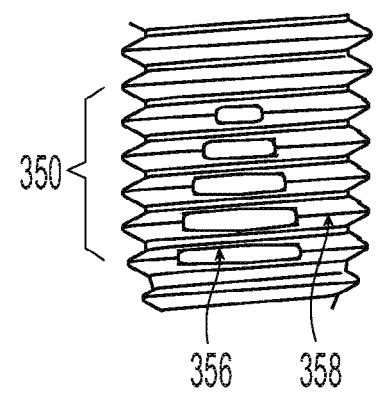

The thread-forming portion 350 of thread-forming fastener 388 may have a bilobular, trilobular, quadlobular, pentalobular, hexalobular or other cross-sectional shape. Of these the pentalobular shape has been found to date to give the best performance in thread forming. In any event, these lobar shapes of the thread-forming portion of the fastener control the thread-forming torque and drive torque to facilitate installation of the fastener, reduce failures in installation, and improve the load carrying capacity of the assembled building members. The thread-forming portion includes a plurality of relief recesses 356 spaced around the thread-forming portion 350 to segment the thread-forming portion 350 into a desired number of lobes 358 forming the bilobular, trilobular, quadlobular, pentalobular, hexalobular or other cross-sectional shape. For example, five relief recesses 356 may be spaced as desired around the thread-forming portion 350 to segment the thread-forming portion 350 into five lobes 358 forming the pentalobular cross-section shown in FIG. 17F, and four relief recesses 145 may be spaced as desired around the thread-forming portion 143 to segment the thread-forming portion 143 into four lobes 139 forming the quadlobular cross-section shown in FIG. 17G. As shown in FIG. 17D, the relief recesses 356 may be longitudinal recesses provided along the axial direction of the fastener. In one alternative, the width of the relief recesses 356 may be wider toward the fluted lead portion forming the triangular shape as shown in FIG. 17E.

Figure 17F:
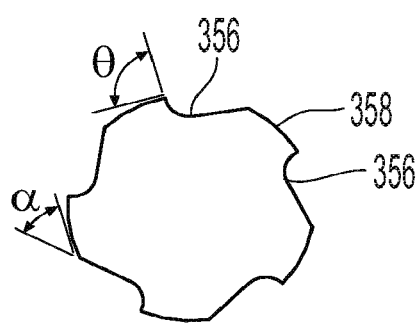
FIGS. 17F-17G illustrate alternative cross-sections through the thread-forming portion shown in FIGS. 17D and 17E.
Figure 17G:
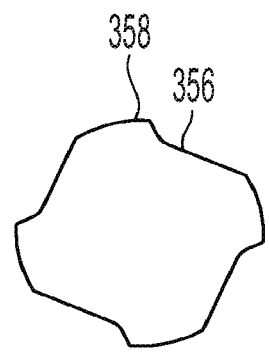

In some embodiments, the thread-forming portion of the fastener includes a series of lobes 358 with relief recesses 356 between about the rotational axis such as shown in FIG. 17F or 17G. Each lobe 358 has a leading portion and a tailing portion, the leading portion and first adjacent recess may be at a first angle, shown as θ in FIG. 17F in a range from 50° to 100° from a plane tangent to the lobe adjacent the leading portion, and the tailing portion and second adjacent recess may be at a second angle, shown as γ in FIG. 17F, in a range from 25° to 50° from a plane tangent to the lobe adjacent the tailing portion. As shown in FIG. 17F, the first angle may be greater than the second angle. Alternatively, the second angle between the tailing portion and second adjacent recess may be in a range from 50° to 100° from a plane tangent to the lobe adjacent the tailing portion. In this alternative, the first angle and the second angle may be approximately the same. The recess may include arcuate surfaces and/or flat surfaces forming the intersection between the recess and the lobe forming the first and second angles.

The relief recesses 356 may extend into the threads of the fastener to about the minor diameter 340. Alternatively, the relief recesses 356 may extend into the shank of the fastener deeper than the minor diameter 340, such as to a depth between about 80% and 99% of the minor diameter. In yet another alternatively, the relief recesses 356 may extend into the threads of the fastener to a depth between the major diameter 342 and the minor diameter 340, such as to a depth between about 101% and 120% of the minor diameter. Each relief recess 356 may be about one thread pitch in width. Alternatively, the relief recesses 356 may be between about 0.8 and 4 thread pitches wide. In one alternative, the width of the relief recesses 356 may be between about 30% and 70% of the formula (π×major diameter/number of lobes) as desired to provide desired separation between the lobes 358. In yet another alternative, the width of the relief recesses 356 may be between about 40% and 60% of the formula (π×major diameter/number of lobes). For example, in one application having 4 lobes (quadralobular), the width of the relief recesses may be approximately 60% of the formula (π×major diameter/number of lobes). In another example, in one application having 2 lobes (bilobular), the width of the relief recesses may be approximately 50% of the formula (π×major diameter/number of lobes). The relief recesses 356 of the thread-forming portion 350 may be between about 3 to 7 thread pitches 344 in axial length. Alternatively, the relief recesses 356 of the thread-forming portion 350 may be between 2 and 5 thread pitches 344 in axial length. Depending upon the size of the fastener, the thread-forming portion 350 may be between about 0.06 and 0.5 inches in length, and may have a thread-forming torque of no more than about ⅓ of the failure torque 420. In any event, the thread-forming torque is less than the torsional strength of the fastener to avoid failure. In one alternative, the thread-forming torque is less than 80% of the torsional strength of the fastener.

The threaded portion 348 of the thread-forming fastener 388 is adapted to install at a drive torque 424 at least 50% less than the thread-forming torque 426, i.e. no more than 50% of the thread-forming torque. In one alternative, the drive torque is less than 30% of the thread-forming torque. Alternatively, the drive torque 424 is between about 5% and 60% of the thread-forming torque 426. To reduce driving torque, the threaded portion 348 may include back-tapered threads, and may have a thread angle less than 60°, represented as a in FIG. 15C. Alternatively, the thread angle may be less than 50°. In yet another alternative, such thread angle may be between 45 and 50°. Reducing the thread angle also reduces the thread pitch 344 and reduces the minor diameter 340. Back-tapered threads as used herein means that the major diameter 342 of the threaded portion 348 has a back-taper such that the major diameter 342 is larger adjacent the thread-forming portion 350 than the major diameter 342 adjacent the head 354. In certain embodiments, the back-taper of the major diameter may be between about 0.0005 and 0.005 inch per inch of axial length. Alternatively, the back-taper may be between about 0.001 and 0.003 inch per inch of length.

The threaded portion 348 of fastener 388 may provide a failure torque 420 of at least 343.94 inch-pounds measured using a fastener 388 having a major diameter of ½ inch threaded into a pilot hole having at least one diameter within nominal diameter between about 80% and 98% of the major diameter 342 and the threaded member having a material thickness of about 0.25 inch (about 6.35 millimeter). For material thicknesses greater than 0.25 inch, the threaded portion may have a seating torque of at least 400 inch-pounds. Alternatively, the threaded portion has seating torque of at least 600 inch-pounds, and may be at least 800 inch-pounds measured using a ½ inch fastener threaded into a pilot hole having at least one diameter within nominal diameter between about 80% and 98% of the major diameter 342 and the threaded member having a material thickness of about 0.25 inch (about 6.35 millimeter).

The thread-forming fastener 388 may be used in connections such as shown in FIGS. 33A, 33B, 34A, and 34B, where the first steel building member, such as the joist 394, includes a clearance hole 380 having a bore diameter larger than the major diameter 342 of the fastener. The second steel building member, such as the girder 386, includes the pilot hole 378. The pilot hole 378 may have a bore diameter between about 70% and 95% of the major diameter 342. Alternatively, the pilot hole 378 may have a bore diameter between about 80% and 98% of the major diameter, and alternatively, between about 80% and 95% of the major diameter 342. The thread-forming fastener 388 may be positioned through the clearance hole 380 in the first member and driven into the pilot hole 378 of the second member. The thread-forming portion 350 forms threads in the bore of the pilot hole enabling the threaded portion 348 to be threaded into the second member, clamping the first member between the head 354 and the threads formed in the second member. The thread-forming fastener 388 may have a major diameter between about ¼ inch and 1 inch, or greater as desired for the size and load requirements for the connection in the assembly. At least a portion of the threaded portion 348 of the thread-forming fastener 388 as shown in FIGS. 16 and 17 may comply with ASTM A307, A354, A325, A490, or other fastener standard as required.

Alternatively, for certain connections, both the first member and the second member may include the pilot hole 378, wherein the thread-forming portion 350 forms threads in both the first and second members.

The self-drilling, thread-forming fastener 362, as shown in FIGS. 18A through 19D, are fasteners of steel comprising the head 354 capable of clamping the first steel building member to the second steel building member with the fastener installed. The self-drilling, thread-forming fastener 362 includes the threaded portion 348 adjacent the head 354, and the thread-forming portion 350 as discussed above adjacent the threaded portion 348 of at least HRC 50 hardness adapted to enable the fastener form threads into at least the second building member. The self-drilling, thread-forming fastener 362 has a fluted lead portion 360 at the tip of the fastener 362 and adjacent the thread-forming portion 350 of at least HRC 50 hardness with a nominal diameter between about 70 and 95% of the major diameter 342 of the threaded portion 348 adapted to form the fastener opening, or pilot hole 378, and typically larger than the minor diameter, although for thin metal applications, such as thinner than 14 gage, or less than 16 gage, the nominal diameter of the fluted lead portion 360 may be smaller than the minor diameter. Alternatively, the fluted lead portion 360 has a nominal diameter between about 80% and 95% of the major diameter 342.

The fluted lead portion 360 may have a swaged or pinched point, a milled point, or a combination of both. The milled point alone, or in combination with preformed swedged or pinched point, is generally desired to ensure effectiveness of the fluted lead portion in drilling through the building members. The length of the fluted lead portion 360 may be longer than the thickness of the building member through which the fluted lead portion drills. It may be useful to provide the fluted lead portion 360 having an axial length between about 1.1 and 2.0 times the thickness of the drilled building member. The fluted lead portion 360 may be a Type 1, Type 2, Type 3, Type 4, Type 5, or a variation thereof.

At least a portion of the threaded portion 348 of the self-drilling, thread-forming fastener 362 may have a hardness between about HRB 70 and HRC 40 through hardness. In one alternative, at least a portion of the threaded portion 348 has a hardness between about HRC 25 and HRC 34. In one alternative, at least a portion of the threaded portion 348 has a through hardness between about HRB 70 and HRB 100. In one alternative, at least a portion of the threaded portion 348 has a through hardness between about HRC 19 and HRC 30. In one alternative, at least a portion of the threaded portion 348 has a through hardness between about HRC 26 and HRC 36. In yet another alternative, at least a portion of the threaded portion 348 has a through hardness between about HRC 33 and HRC 39. As discussed above, the hardness of the threaded portion 348 may be selected to comply with ASTM A307, ASTM A325, ASTM A354, ASTM A490 or other fastener standard. Alternatively or in addition, the hardness of the threaded portion 348 may be selected to comply with SAE J429 Grade 2, SAE J429 Grade 5, and SAE J429 Grade 8, or other fastener standard.

In yet another alternative, the self-drilling, thread-forming fastener may be case hardened to at least HRC 50. For certain applications, the self-drilling, thread-forming fastener may be a case hardened fastener. In the figures, such as FIGS. 15 and 16, in which under certain applications may utilize a case hardened self-drilling, thread-forming fastener, the fastener will be referenced as a case hardened self-drilling, thread-forming fastener 396. The case hardened self-drilling, thread-forming fastener 396 may have a major diameter 342 of between about 0.18 and 0.26 inch.

Adjacent the thread-forming portion 350, a portion of the threaded portion 348 may have a hardness greater than about HRC 50, and may be greater than about HRC 54. Up to five threads between the threaded portion and the thread-forming portion 350 may be hardened to at least HRC 50 or at least HRC 54. The threaded portion 348 of the self-drilling, thread-forming fastener 362 may be through-hardened such that the fastener is ductile through the threaded portion. As discussed above, as the self-drilling, thread-forming fastener 362 is installed connecting a first steel building member and a second steel building member, the fastener 388 may be tightened to clamp the first member between the head 354 and the formed threads in the second building member. As the thread-forming fastener 388 is tightened, a portion of the threaded portion 348 between the head 354 and the threads engaging the second building member elongate providing a clamping load on the connection according to design requirements. The present thread-forming fasteners 388 have sufficient ductility for structural connections such as slip-critical connections.

The self-drilling, thread-forming fastener 362 typically has a major diameter between about 0.12 inch and about ½ inch. In certain instances, the size of the fastener 362 may be limited by the ability of the fluted lead portion 360 to function in drilling at larger sizes. In a connection between a first and a second building member, the first building member may have a clearance hole 380 having a diameter larger than the major diameter of the fastener 362. The self-drilling, thread-forming fastener 362 is installed through the clearance hole and rotated into the second member. The fluted lead portion 360 drills an opening through the second member, and the thread-forming portion 350 forms threads in the bore of the drilled fastener opening for the threaded portion 348 to engage the second building member. The self-drilling, thread-forming fastener 362 is tightened to clamp the first member between the head 354 and the threads formed in the second member. The threaded second member acts as a nut, and in certain applications, no nut may be required based on design requirements. Alternatively, the self-drilling, thread-forming fastener 362 may be installed in a pilot hole, and the thread-forming portion 350 forms threads in the bore of the pilot hole for the threaded portion 348 to engage the second building member. In yet another alternative, neither clearance hole or pilot hole is provided and the fluted lead portion 360 drills through both the first and second member, and the thread-forming portion 350 forms threads in the bore of the drilled fastener opening for the threaded portion 348 to engage with the formed threads in both the first and second members. Optionally, the self-drilling, thread-forming fastener 362 may include an unthreaded shank portion between the head 354 and the threaded portion 348 as desired for the connection. If provided, the length of an unthreaded shank portion and the axial length of the threaded portion 348 may be selected according to the thickness of the first and second building members and desired length of thread engagement. For example, in certain bearing-type connections with threads excluded from the shear plane, an unthreaded shank portion may be desired having a length greater than the thickness of the first building member such that the threaded portion 348 engages the second building member clamping the first building member between the head 354 and the threads engaging the second building member. In any case, the threaded engagement with the first and/or second building member acts as a nut, and for certain applications, no nut may be required based on design requirements. Examples of various configurations of installation of self-drilling, thread-forming fastener 362 with and without clearance holes and/or pilot holes are disclosed in applications described herein, and each application disclosed is not limited to the configuration described.

Figure 26A:
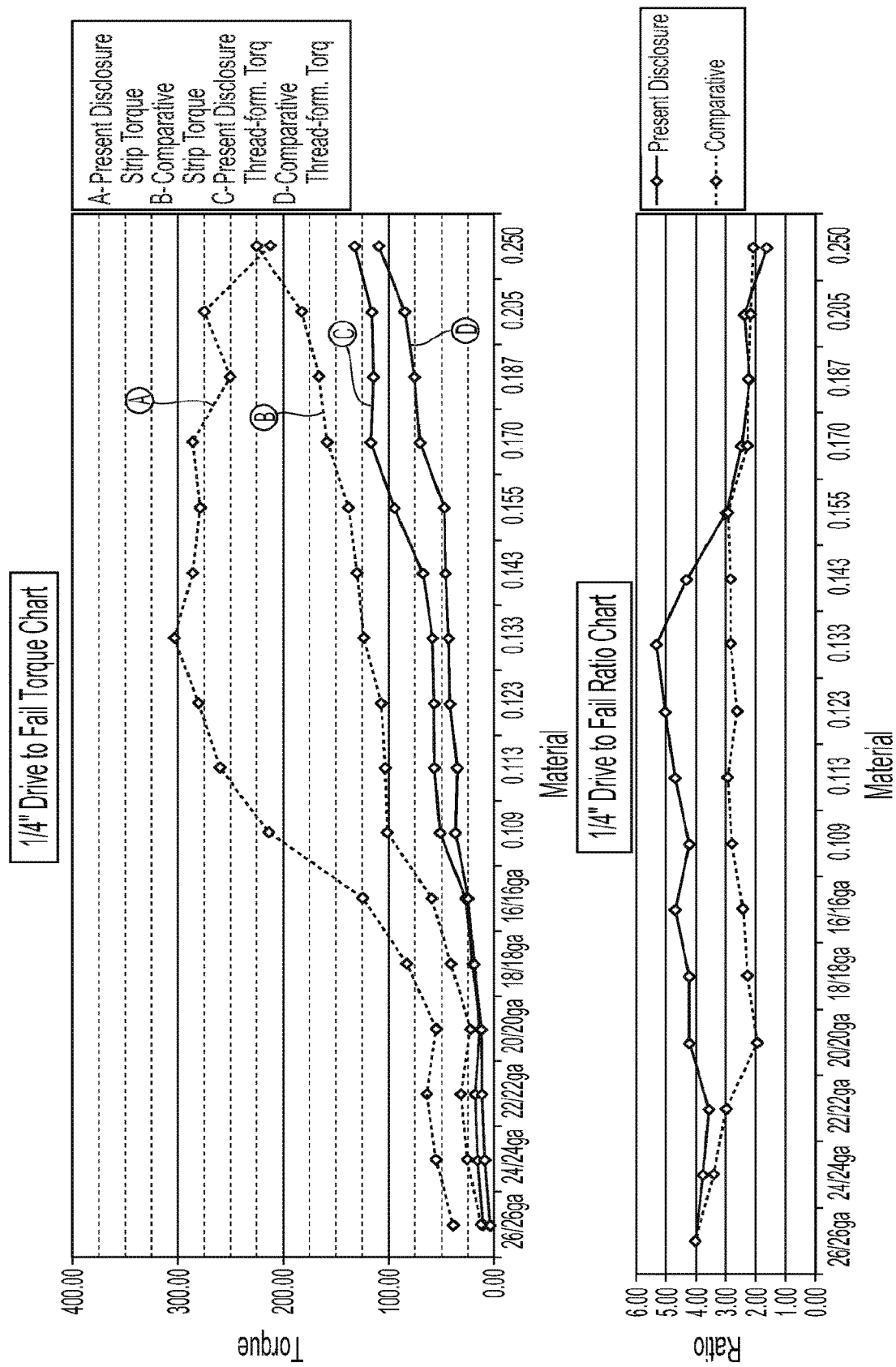
FIG. 26A is a graph of thread-forming torque, failure torque, and failure to thread-forming torque ratios for a ¼ inch major diameter self drilling, thread-forming fastener of FIG. 18A and a comparative sample installed in steel sheets of various thicknesses.

The present self-drilling, thread-forming fastener 362, 396 provides a ratio of strip torque to thread-forming torque of at least 3.0 and a ratio of strip torque to drive torque greater than 6.0 over a range of combined thickness of first and second steel building members from 0.036 inch to 0.084 inch. As shown in FIG. 26A, samples of a ¼ inch major diameter self-drilling, thread-forming fastener 362 of the present disclosure identified as manufacturer's samples ETC045 were installed into materials of different thicknesses and compared to prior ¼ inch major diameter fasteners. For steel sheet samples between 26 gage and 16 gage, the fasteners were installed into two sheets together. Additionally, the fasteners were installed into one steel sheet thickness for materials between about 0.109 and 0.25 inch thickness. Ten samples were used for each tested thickness. TABLE 2 shows typical gage thickness for steel sheet (source: Steel Deck Institute).

TABLE 2

| GAGE | ONE SHEET THICKNESS | TWO SHEET THICKNESS |
|---|---|---|
| 16 | .0598 | 0.120 |
| 18 | .0474 | 0.096 |
| 20 | .0358 | 0.072 |
| 22 | .0295 | 0.060 |
| 24 | .0238 | 0.048 |
| 26 | .0179 | 0.036 |

FIG. 26A and TABLE 3 show the ratio of strip torque to thread-forming torque for the tested fasteners. The ¼ inch self-drilling, thread-forming fastener 362 provided a ratio of strip torque to thread-forming torque of at least 3.0 for all thicknesses tested up to and including 0.143 inch thick sheet. Alternatively, the ¼ inch self-drilling, thread-forming fastener 362 provided a ratio of strip torque to thread-forming torque of at least 3.5 for all thicknesses tested up to and including 0.143 inch thick sheet. TABLE 4 provides the strip torque and thread-forming torque for the ¼ inch samples tested.

TABLE 3

| | ¼ inch Present Disclosure Strip Torque to Thread-forming Torque Ratio | ¼ inch Comparative Sample Strip Torque to Thread-forming Torque Ratio |
|---|---|---|
| 26/26 gage | 4.01 | 4.00 |
| 24/24 gage | 3.73 | 3.42 |
| 22/22 gage | 3.56 | 2.96 |
| 20/20 gage | 4.19 | 1.95 |
| 18/18 gage | 4.23 | 2.27 |
| 16/16 gage | 4.67 | 2.43 |
| 0.109 | 4.18 | 2.78 |
| 0.113 | 4.67 | 2.95 |
| 0.123 | 5.00 | 2.59 |
| 0.133 | 5.27 | 2.84 |
| 0.143 | 4.29 | 2.84 |
| 0.155 | 2.96 | 2.94 |
| 0.170 | 2.46 | 2.26 |
| 0.187 | 2.19 | 2.23 |
| 0.205 | 2.39 | 2.18 |
| 0.250 | 1.62 | 2.09 |

TABLE 4

| | ¼ inch Present Disclosure Thread-forming Torque (in-lb) | ¼ inch Present Disclosure Strip Torque (in-lb) | ¼ inch Comparative Sample Thread-forming Torque (in-lb) | ¼ inch Comparative Sample Strip Torque (in-lb) |
|---|---|---|---|---|
| 26/26 gage | 9.73 | 38.98 | 3.18 | 12.73 |
| 24/24 gage | 14.84 | 55.37 | 7.43 | 25.43 |
| 22/22 gage | 18.01 | 64.17 | 10.97 | 32.43 |
| 20/20 gage | 13.13 | 55.06 | 11.38 | 22.16 |
| 18/18 gage | 19.69 | 83.24 | 18.27 | 41.55 |
| 16/16 gage | 26.61 | 124.25 | 24.37 | 59.22 |
| 0.109 | 51.14 | 213.89 | 36.8 | 102.37 |
| 0.113 | 55.80 | 260.42 | 35.16 | 103.7 |
| 0.123 | 56.01 | 280.28 | 41.73 | 107.98 |
| 0.133 | 57.53 | 303.09 | 43.34 | 123.17 |
| 0.143 | 66.68 | 285.87 | 45.79 | 130.26 |
| 0.155 | 94.43 | 279.12 | 46.99 | 138.33 |
| 0.170 | 116.35 | 286.48 | 70.25 | 158.82 |
| 0.187 | 114.43 | 250.67 | 74.78 | 167.03 |
| 0.205 | 115.50 | 275.52 | 84.04 | 182.91 |
| 0.250 | 131.23 | 212.22 | 108.13 | 225.76 |

The ratio of strip torque to thread-forming torque is at least 3.0 and a ratio of strip torque to drive torque greater than 6.0 over a range of combined thickness of first and second steel building members from 0.036 inch to 0.084 inch. Alternatively, the present self-drilling, thread-forming fasteners 362, 396 may have a ratio of strip torque to thread-forming torque of at least 3.0 and a ratio of strip torque to drive torque greater than 8.0 over a range of combined thickness of first and second steel building members from 0.036 inch to 0.084 inch. Alternatively, the fasteners may have a ratio of strip torque to thread-forming torque of at least 3.5 and a ratio of strip torque to drive torque greater than 6.0 over a range of combined thickness of first and second steel building members from 0.036 inch to 0.084 inch. In yet another alternative, the ratio of strip torque to thread-forming torque may be at least 3.5 and a ratio of strip torque to drive torque greater than 8.0 over a range of combined thickness of first and second steel building members from 0.036 inch to 0.084 inch. In yet another alternative, the ratio of strip torque to thread-forming torque may be at least 3.0 and a ratio of strip torque to drive torque greater than 4.0 over a range of combined thickness of first and second steel building members from 0.036 inch to 0.108 inch. In another alternative, the fasteners may have a ratio of strip torque to thread-forming torque of at least 3.0 and a ratio of strip torque to drive torque greater than 6.0 over a range of combined thickness of first and second steel building members from 0.036 inch to 0.108 inch. Alternatively, the present self-drilling, thread-forming fasteners 362, 396 may have a ratio of strip torque to thread-forming torque of at least 4.0 and a ratio of strip torque to drive torque greater than 8.0 over a range of combined thickness of first and second steel building members from 0.054 inch to 0.084 inch. Alternatively, the fasteners may provide a ratio of strip torque to thread-forming torque of at least 4.0 and a ratio of strip torque to drive torque greater than 10.0 over a range of combined thickness of first and second steel building members from 0.054 inch to 0.084 inch.

Figure 26B:
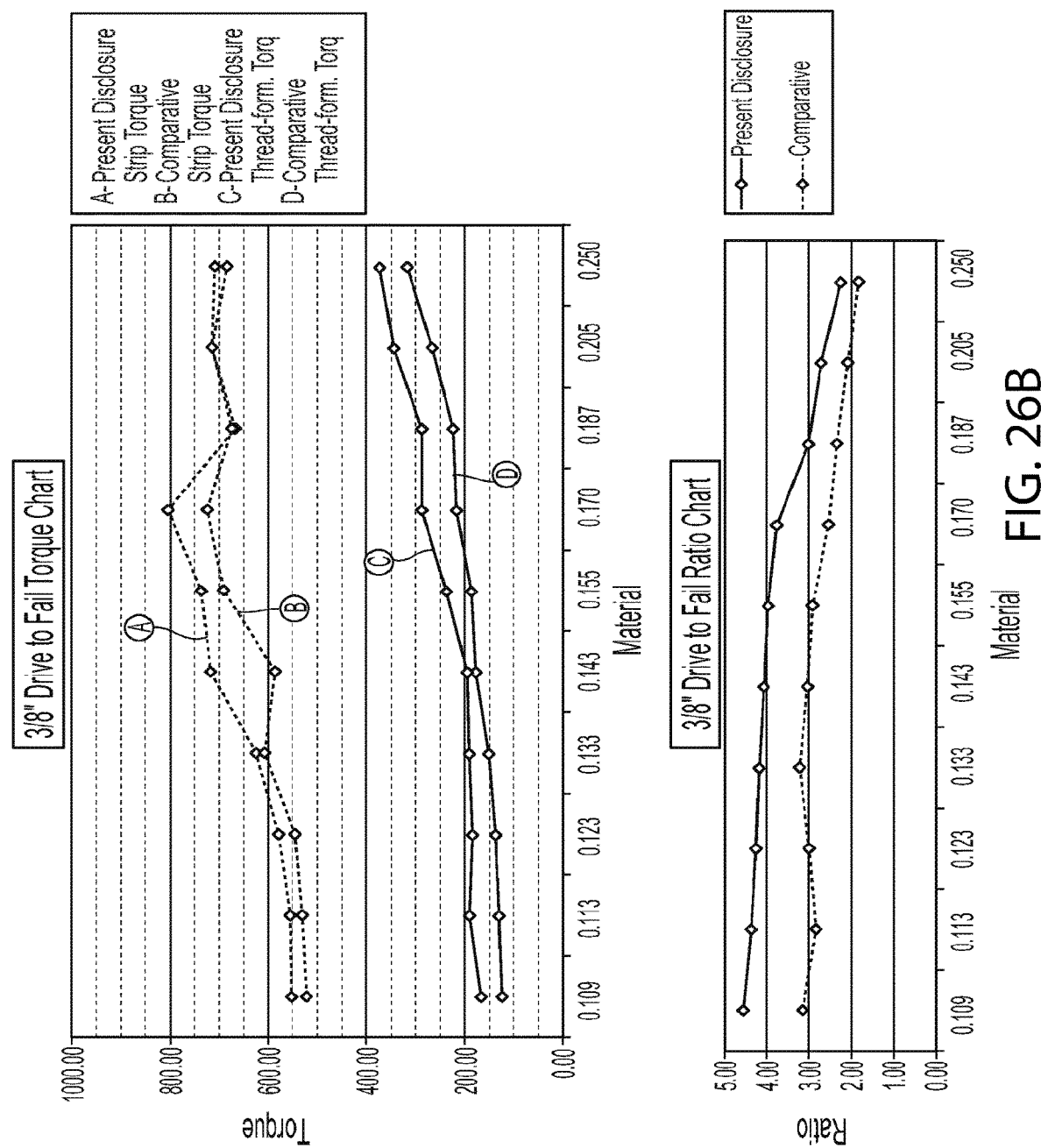
FIG. 26B is a graph of thread-forming torque, failure torque, and failure to thread-forming torque ratios for a ⅜ inch major diameter self drilling, thread-forming fastener of FIG. 18A and a comparative sample installed in steel sheets of various thicknesses.

For certain applications, the self-drilling, thread-forming fasteners 362, 396 are capable of providing a ratio of failure torque to thread-forming torque of at least 3.0 and a ratio of failure torque to drive torque greater than 6.0 over a range of combined thickness of first and second steel building members from 0.10 inch to 0.32 inch. As shown in FIG. 26B, samples of a ⅜ inch major diameter self-drilling, thread-forming fastener 362 of the present disclosure identified as manufacturer's samples 360-80952-60 were installed into a 0.302 diameter pilot hole in materials of different thicknesses and compared to prior ⅜ inch major diameter fasteners. The fastener samples were installed into single steel sheet thicknesses between about 0.109 and 0.25 inch thickness. Ten samples were used for each tested thickness. TABLE 5 shows the ratio of strip torque to thread-forming torque for the tested fasteners. The ⅜ inch self-drilling, thread-forming fastener 362 provided a ratio of strip torque to thread-forming torque of at least 3.0 for all thicknesses tested up to and including 0.187 inch thick sheet. TABLE 6 shows the failure torque and the thread-forming torque for the ⅜ inch samples tested.

TABLE 5

| | 3/8 inch Present Disclosure Strip Torque to Thread-forming Torque Ratio | 3/8 inch Comparative Sample Strip Torque to Thread-forming Torque Ratio |
|---|---|---|
| 0.109 | 4.54 | 3.15 |
| 0.113 | 4.34 | 2.83 |
| 0.123 | 4.32 | 3.00 |
| 0.133 | 4.17 | 3.23 |
| 0.143 | 4.07 | 3.04 |
| 0.155 | 3.95 | 2.92 |
| 0.170 | 3.75 | 2.53 |
| 0.187 | 3.00 | 2.35 |
| 0.205 | 2.68 | 2.08 |
| 0.250 | 2.24 | 1.83 |

TABLE 6

| | 3/8 inch Present Disclosure Thread-forming Torque (in-lb) | 3/8 inch Disclosure Invention Strip Torque (in-lb) | 3/8 inch Comparative Sample Thread-forming Torque (in-lb) | 3/8 inch Comparative Sample Strip Torque (in-lb) |
|---|---|---|---|---|
| 0.109 | 121.83 | 552.62 | 165.35 | 520.63 |
| 0.113 | 128.16 | 556.18 | 188.02 | 531.63 |
| 0.123 | 136.25 | 576.89 | 182.13 | 545.9 |
| 0.133 | 149.72 | 625 | 188.02 | 608.06 |
| 0.143 | 176.16 | 716.7 | 192 | 583.56 |
| 0.155 | 186.66 | 737.11 | 236.14 | 690.14 |
| 0.170 | 214.49 | 804.78 | 286.1 | 724.11 |
| 0.187 | 223.23 | 668.83 | 266.83 | 673.98 |
| 0.205 | 266.46 | 713.15 | 342.96 | 712.69 |
| 0.250 | 316.59 | 708.05 | 373.44 | 685.13 |

As shown in FIG. 26B and TABLE 4, the ratio of failure torque to thread-forming torque of at least 3.0 for samples tested in material thicknesses from 0.109 through 0.187. It is contemplated that fasteners with the present thread-forming portion can obtain a ratio of failure torque to thread-forming torque of at least 3.0 up to thicknesses of 0.32.

Figure 27:
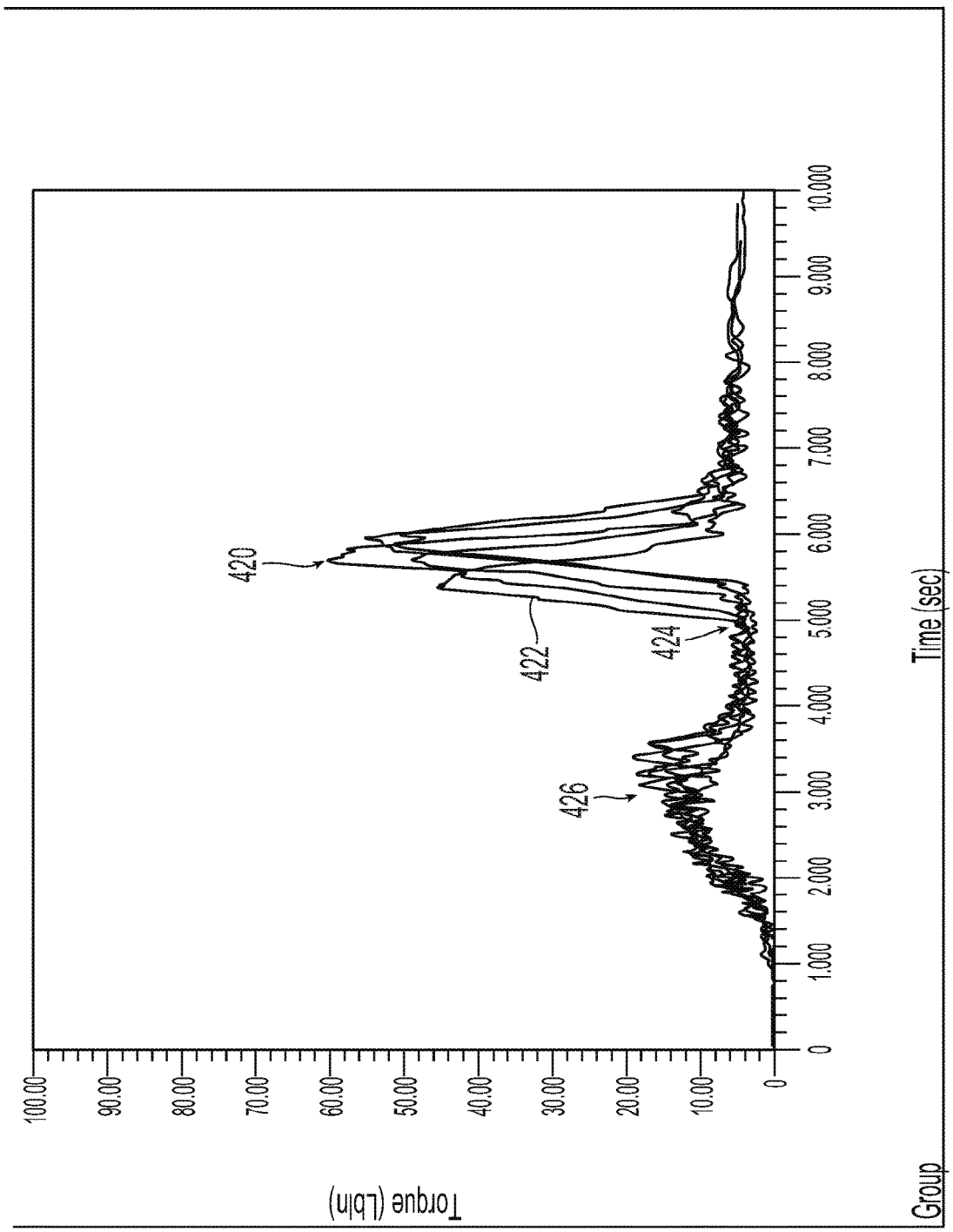
FIG. 27 is a graph of torque to over time during installation for the self-drilling, thread-forming fastener of FIG. 18A installed in two steel sheets having a combined thickness of about 0.06 inch.

As shown in the graph of FIG. 27, the self-drilling, thread-forming fastener 362 has a drilling torque to rotate the fluted lead portion 360 into the first and second building members forming the fastener opening. Additionally, the drive torque 424 is at least 50% less than the thread-forming torque 426. As discussed above, the drive torque 424 may be between about 5% and 60% of the thread-forming torque 426. The self-drilling, thread-forming fasteners 362 have the added advantage of increased back-out resistance and are less likely to come loose by vibration.

The installation torque over time for the self-drilling, thread-forming fastener 362 was measured and shown in FIG. 27. Five samples identified as manufacturer's samples ETC040 having a major diameter of ¼ inch were installed at 175 revolutions per minute into pilot holes corresponding to the fluted lead portion 360 into first and second steel members having a combined thickness of about 0.06 inch. The thread-forming torque 426 as shown in the graph of FIG. 27 is less than about 20 inch-pounds. Alternatively, the thread-forming torque 426 may be less than about 15 inch-pounds. The drive torque 424, before the torque rises to seating, is less than about 6 inch-pounds. The failure torque 420 is greater than 40 inch-pounds. For certain samples, the failure torque is greater than 50 inch-pounds, and one sample greater than about 60 inch-pounds. The failure torque 420 shown in FIG. 27 is a strip torque. The ratio of strip torque to thread-forming torque may be at least 3.0 and the ratio of strip torque to drive torque is greater than 6.0 when the first and second steel members have a combined thickness of 0.06 inch (about 1.5 millimeter) and the nominal diameter of the fluted lead portion 360 is between 70 and 95% of major diameter. Alternatively, the ratio of strip torque to thread-forming torque may be at least 3.0 and the ratio of strip torque to drive torque is greater than 6.0 when the first and second steel members have a combined thickness of 0.06 inch (about 1.5 millimeter) and the nominal diameter of the fluted lead portion 360 is between 70 and 95% of major diameter. The ratio of strip torque to drive torque may be greater than 10.

Figure 28:
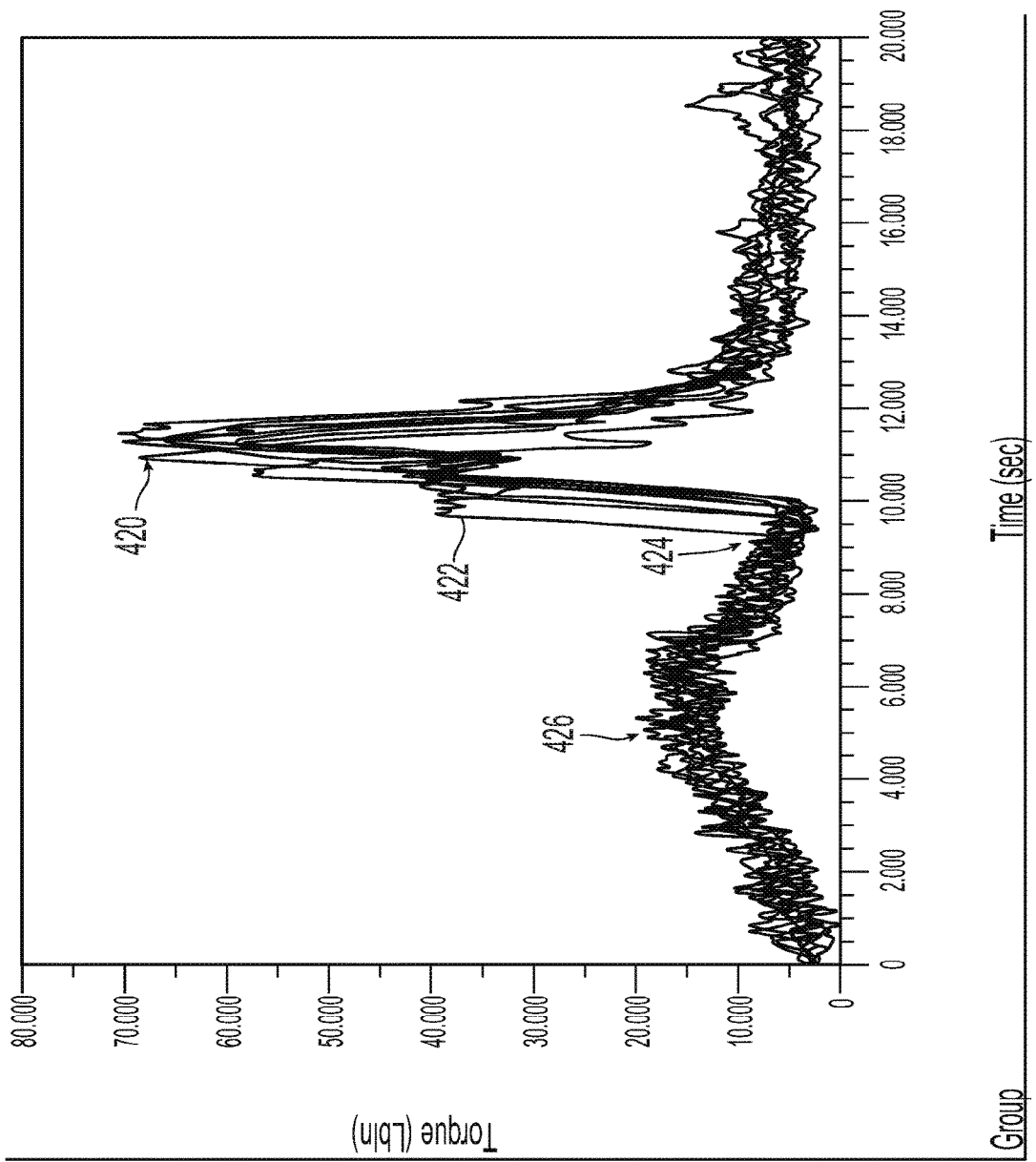
FIG. 28 is a graph of torque to over time during installation for alternative self-drilling, thread-forming fasteners of FIG. 18A installed in two steel sheets having a combined thickness of about 0.06 inch.

Further testing of ¼ inch major diameter self-drilling, thread-forming fasteners 362 is shown in FIG. 28. As with the experiment shown in FIG. 27, the installation torque over time for the self-drilling, thread-forming fastener 362 was measured using ten samples identified as manufacturer's samples ETC045 having a major diameter of ¼ inch installed at 175 revolutions per minute into two 22 gage steel members having a combined thickness of about 0.06 inch and plotted in the graph of FIG. 28. In this test sample, the average thread-forming torque 426 of the samples was 18 inch-pounds. As shown in the graph of FIG. 28, the thread-forming torque is less than about 20 inch-pounds. The drive torque 424, before the torque rises to seating, is less than about 10 inch-pounds. The failure torque 420 is greater than 60 inch-pounds. For certain samples, the failure torque is greater than 65 inch-pounds, and one sample greater than 70 inch-pounds. The average failure torque for the tested samples of the present ¼ fastener was 64.2 inch-pounds.

Figure 29:
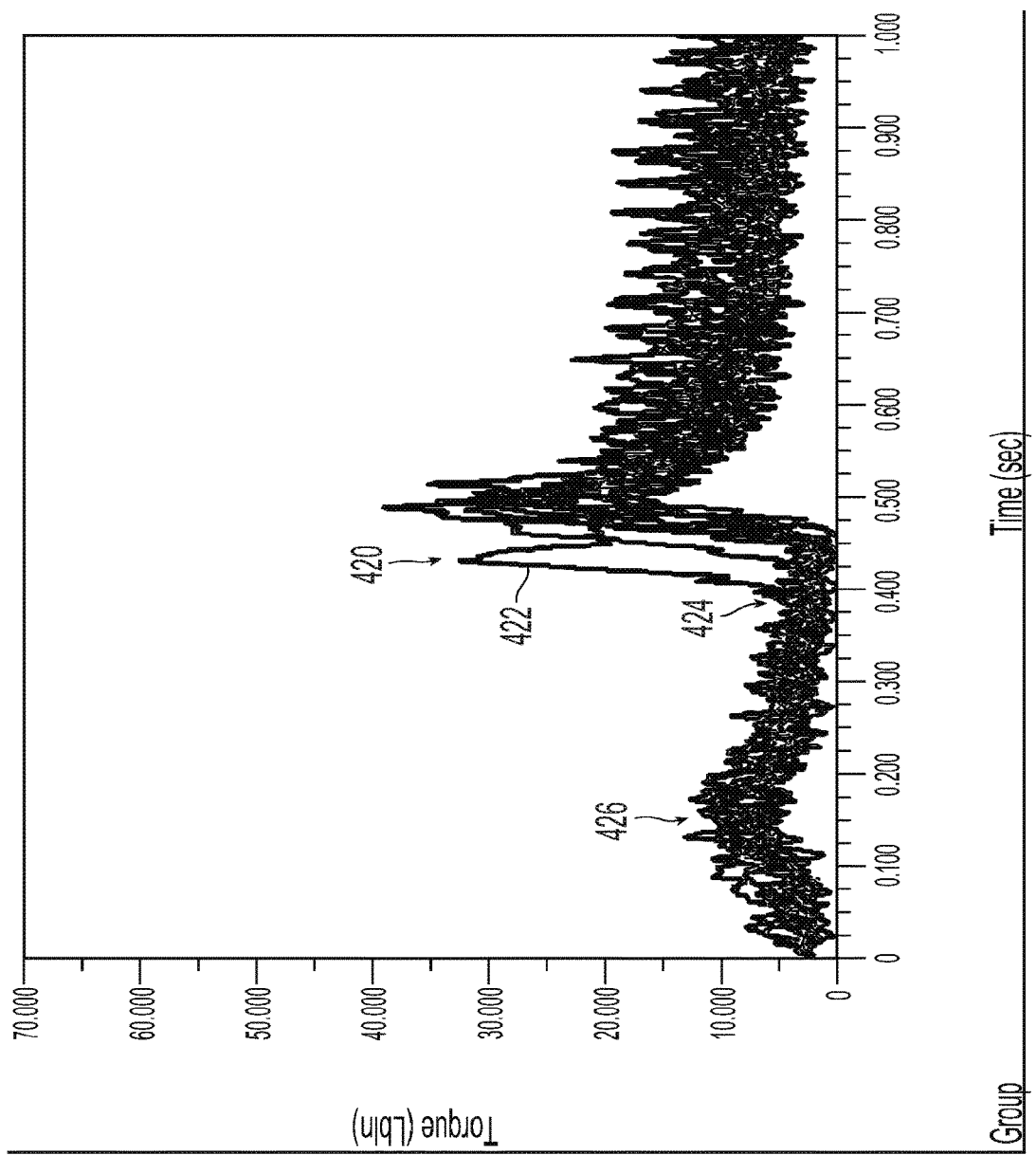
FIG. 29 is a graph of torque to over time during installation for a comparative self-drilling fastener installed in two steel sheets having a combined thickness of about 0.06 inch.
Figure 30A:
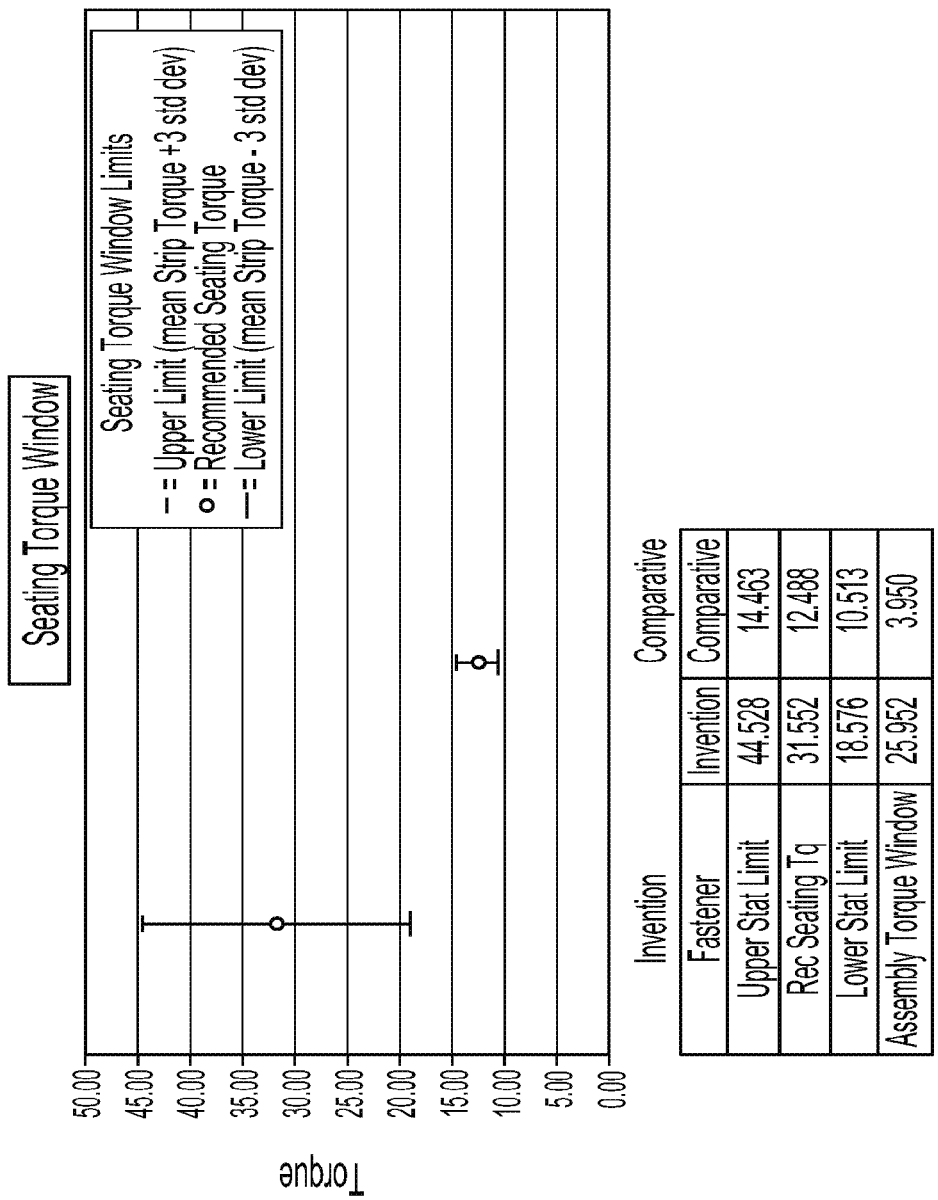
FIGS. 30A through 30D are graphs of seating torque calculated for ¼ inch self-drilling, thread-forming fasteners and comparative samples for various material thicknesses.
Figure 30B:
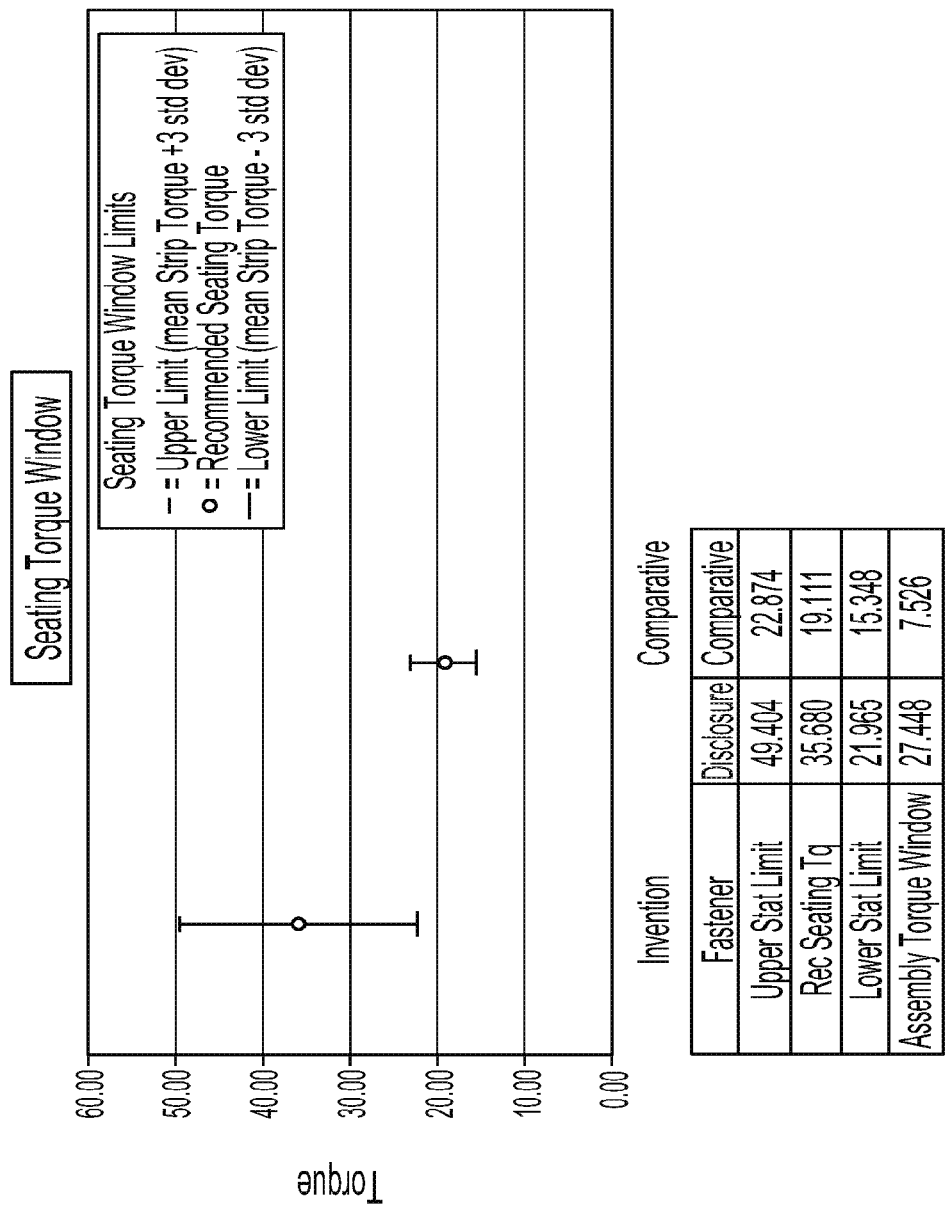
Figure 30C:
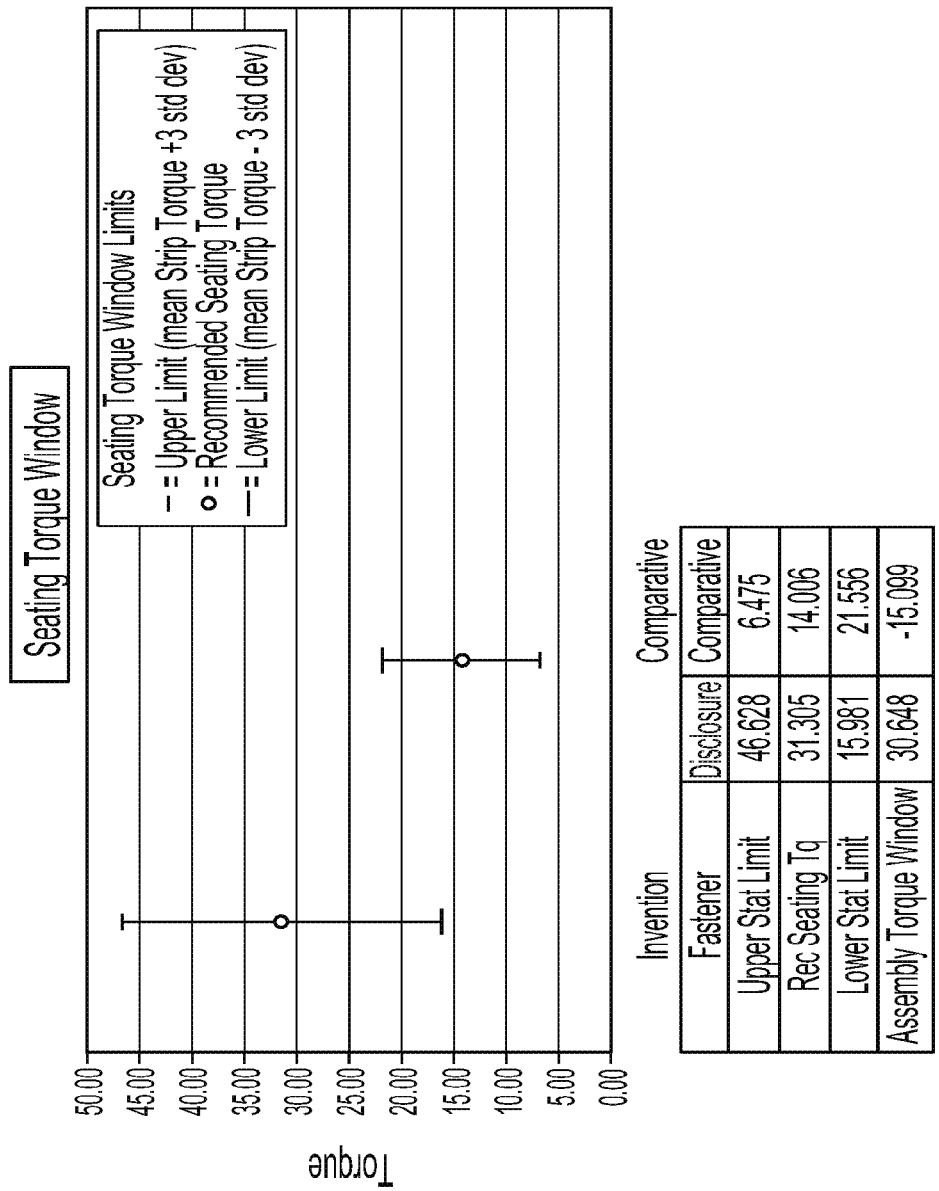
Figure 30D:
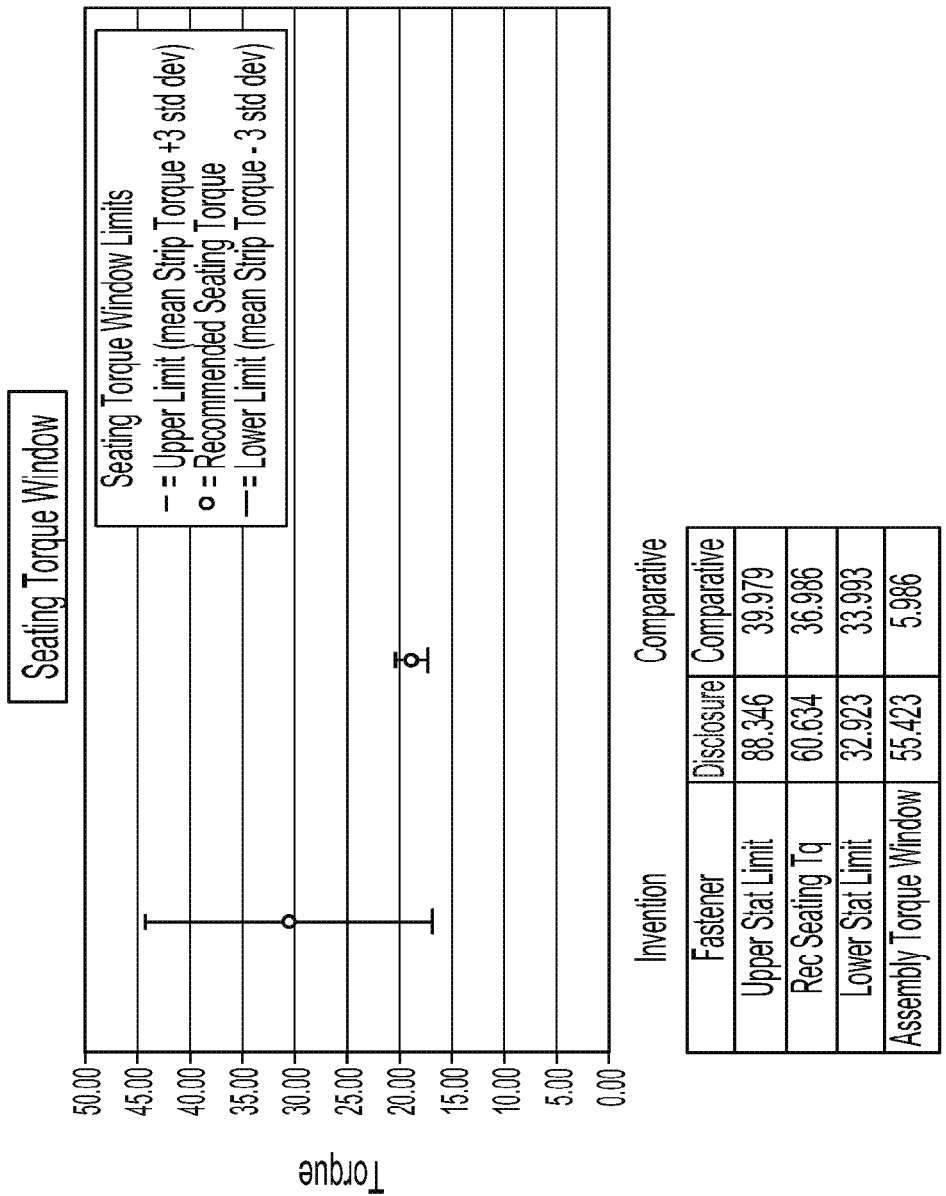

FIG. 29 shows installation torque over time for comparative samples of prior ¼ inch fasteners. The comparative fasteners lacked the present thread-forming portion, instead utilizing prior technology. The graph of FIG. 29 shows the significantly lower failure torque of the ten samples. The average failure torque for the tested comparative ¼ inch samples was 32.4 inch-pounds.

The present self-drilling, thread-forming fastener 362, 396 provides a larger seating torque window than prior fasteners in certain applications. The seating torque window is one measure for a range of seating torques in which the fastener may be installed providing a desired clamping and inhibiting stripping of the fastener or other fastener failure. FIGS. 30A through 30D show seating torque windows for present and comparative test samples installed in two thicknesses of 24 gage material (FIG. 30A), two thicknesses of 22 gage material (FIG. 30B), two thicknesses of 20 gage material (FIG. 30C), and two thicknesses of 22 gage material (FIG. 30D) as examples of improvements in seating torque. The seating torque window is calculated using the test data for strip torque minus three standard deviations of the strip torque data for the upper limit, and the thread-forming torque minus three standard deviations of the thread-forming torque for the lower limit. In the test shown in FIG. 30C, the competitive samples varied so greatly in failure torque that three standard deviations from the strip torque was lower than the thread-forming torque, shown by a negative torque window in the table in FIG. 30C. The improved consistency and performance of the present fasteners provides a greater seating torque window for certain applications. The larger seating torque window provides a larger seating target for various operators and various fastener drivers to achieve.

Figure 31:
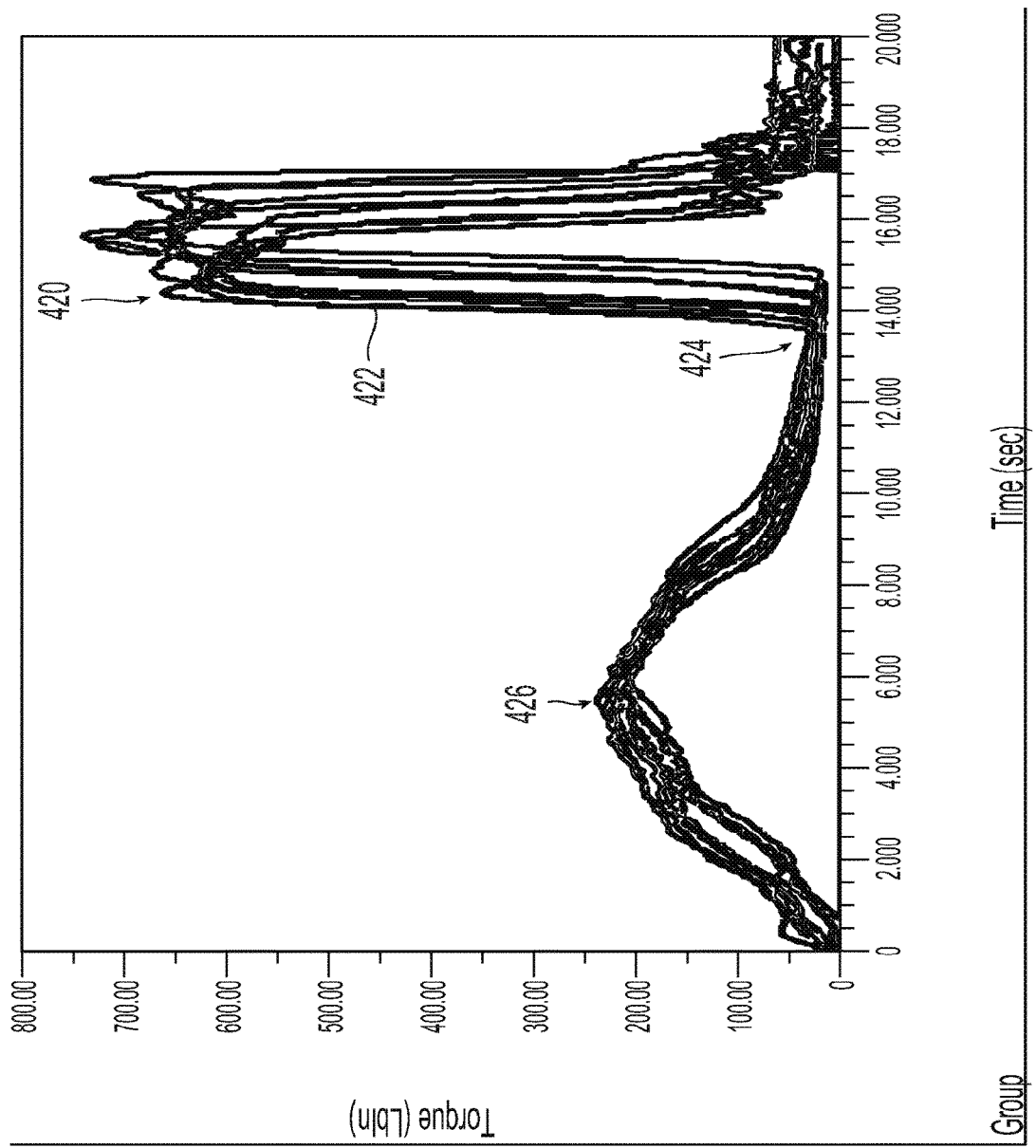
FIG. 31 is a graph of torque to over time during installation for the self-drilling, thread-forming fastener of FIG. 18A installed in a steel sheet having a thickness of about 0.187 inch.

Test results for samples of ⅜ inch major diameter self-drilling, thread-forming fasteners 362 is shown in FIG. 31. The installation torque over time for the self-drilling, thread-forming fastener 362 was measured using ten samples identified as manufacturer's samples 360-80952-60 having a major diameter of ⅜ inch installed at 175 revolutions per minute into a single sheet of 0.187 inch thick material and plotted in the graph of FIG. 31. In this test sample, the average thread-forming torque 426 of the samples was 223.2 inch-pounds. As shown in the graph of FIG. 31, the thread-forming torque is less than about 250 inch-pounds. The drive torque 424, before the torque rises to seating, is less than about 50 inch-pounds. The failure torque 420 is greater than 600 inch-pounds. For certain samples, the failure torque is greater than 650 inch-pounds, and several samples were greater than 700 inch-pounds. The average failure torque for the tested samples of the present ⅜ fastener was 668.8 inch-pounds.

Figure 32:
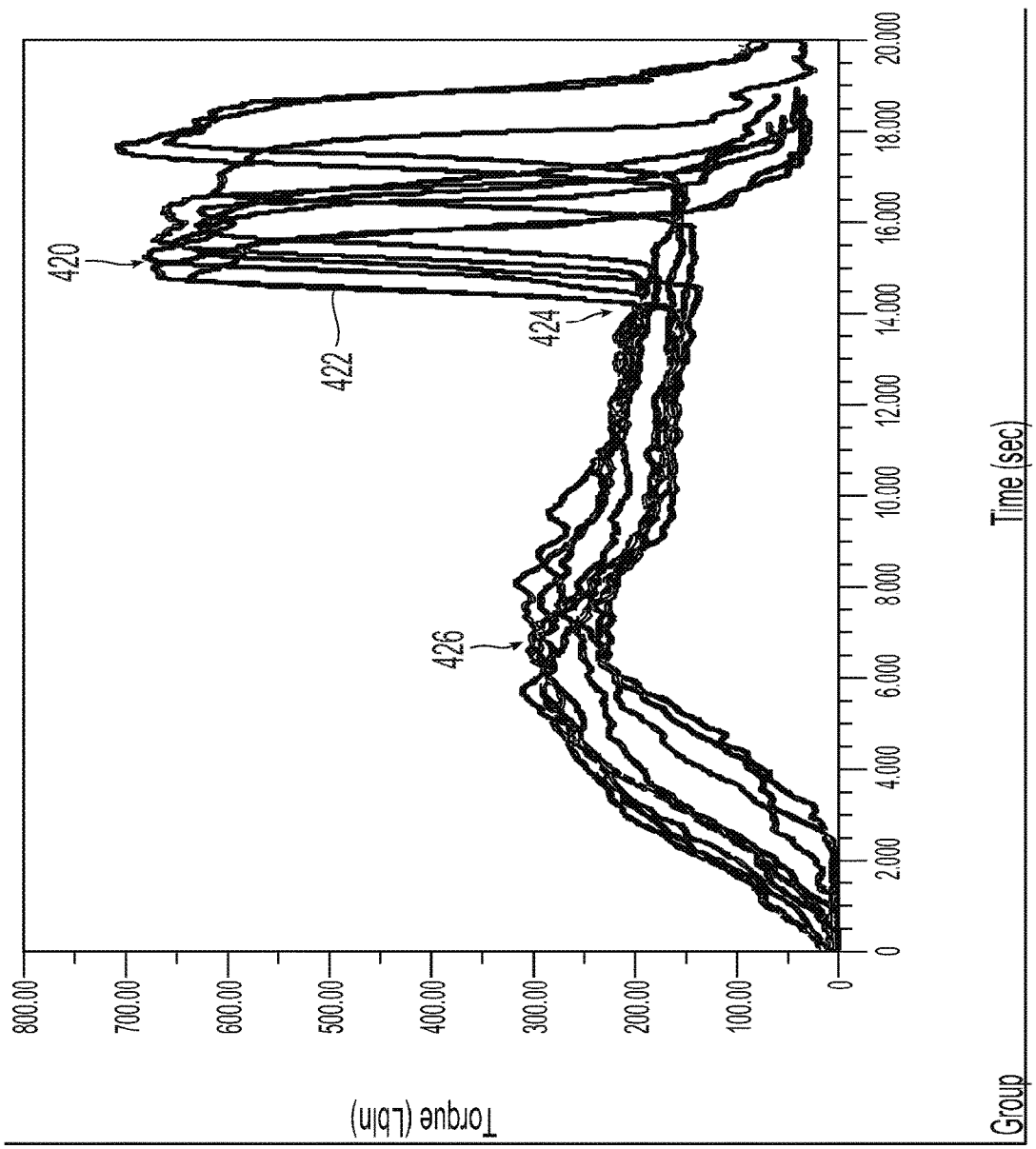
FIG. 32 is a graph of torque to over time during installation for a comparative self-drilling fastener installed in a steel sheet having a thickness of about 0.187 inch.

FIG. 32 shows installation torque over time for comparative samples of the prior ⅜ inch fasteners in 0.187 thick material. The graph of FIG. 32 shows higher thread-forming torque required to drive the prior fasteners. The average thread-forming torque of the ten samples was 286.8 inch-pounds. Additionally, the drive torque is significantly higher than the present fasteners as shown in FIG. 31. The drive torque for the comparative fastener samples is greater than 125 inch-pounds, and for most samples is greater than 150 inch-pounds. The ratio of failure torque to drive torque for the comparative fasteners is less than about 5.

To increase the strip torque when the threaded building member is a thin material such as less than 14 gage, or less than 16 gage, the threaded portion 348 may extend to the head 354 such that the major diameter 342 of the threaded portion 348 is extending to within 1.5 of the thread pitch of the head 354, as indicated in the detail of FIG. 18A by reference 352. Alternatively, the major diameter extends to within 1.2 thread pitches of the head 354. In yet another alternative, the major diameter 342 extends to within about one thread pitch of the head. Optionally, the head 354 of the fastener may be undercut such as shown in the detail of FIG. 19A approximately adjacent where the threaded portion joins the head and adapted to deform the first steel building member on tightening of the fastener. Alternatively, the fastener may be undercut and adapted to deform the first and second steel building member on tightening of the fastener. The undercut may include a radius 343 at least about 0.02 inch radius, and may be at least about 0.03 inch radius adjacent where the threaded portion joins the head. Alternatively, or in addition, a serrated surface may be provided on the underside of the head 354 to engage the surface of the first steel building member. The serrated surface may comprise serrations, projections, nibs, or other deformations or protrusions as desired positioned on the underside of the head 354, and may be positioned in the undercut, if provided.

In one alternative, the head is undercut adjacent where the threaded portion joins the head and the major diameter of the threaded portion extends to within 1.5 of the thread pitch of the head. The close proximity of the threads to the underside of the head further assists the deformation of at least the first steel building member into the undercut on tightening of the fastener. We have found that the deformation of at least the first building member into the undercut improves the connection strength by increasing the strip torque and inhibiting failure modes caused by tipping of the fastener under sheet sheer when the threaded building member is a thin material such as less than 14 gage, or less than 16 gage. In certain applications, the improved performance the present fasteners 362, 396 may allow a fewer number of fasteners to be used to provide the desired design requirement at an increased efficiency.

The threaded portion 348 of fastener 362 may provide a seating torque of at least 420 inch-pounds measured using a fastener 362 having a major diameter of about ¼ inch with the fluted lead portion 360 having at least one diameter within nominal diameter between about 80% and 95% of the major diameter 342 and installed in a first and second building member having a combined material thickness of at least 0.125 inch (about 3.2 millimeter). Alternatively, the threaded portion has seating torque of at least 100 inch-pounds, and may be at least 120 inch-pounds measured using a ¼ inch fastener with the fluted lead portion 360 having at least one diameter within nominal diameter between about 80% and 95% of the major diameter 342 and installed in a first and second building member having a combined material thickness of at least 0.125 inch (about 3.2 millimeter).

For larger diameter self-drilling, thread-forming fasteners 362 such as having a major diameter 342 of ⅜ inch, the threaded portion 348 of fastener 388 may provide a failure torque 420 of at least 600 inch-pounds measured using a fastener 362 having a major diameter of ⅜ inch and a fluted lead portion 360 having a nominal diameter between about 80% and 98% of the major diameter 342 and the threaded member having a material thickness of about 0.25 inch (about 6.35 millimeter). For material thicknesses greater than 0.25 inch, the threaded portion may have a seating torque of at least 400 inch-pounds. Alternatively, the threaded portion has seating torque of at least 600 inch-pounds, and may be at least 800 inch-pounds measured using a ⅜ inch fastener having a fluted lead portion 360 having a nominal diameter between about 80% and 98% of the major diameter 342 and the threaded member having a material thickness of about 0.25 inch (about 6.35 millimeter).

As discussed above, the threaded portion 348 of the thread-forming fasteners 388 and self-drilling, thread-forming fastener 362, 396 may include back-tapered threads, and may have a thread angle less than 60°. Alternatively, the thread angle may be less than 50°. In yet another alternative, the threads may have a thread angle between 45 and 50°. The back-taper of the major diameter may be between about 0.0005 and 0.005 inch per inch of axial length. Alternatively, the back-taper of major diameter may be between about 0.001 and 0.003 inch per inch of length. In the past, the thread portion of fasteners used for building structures typically had a pitch angle of 60°. We have found that the drive torque required to drive prior self-tapping fasteners after thread-forming was nearly the same as the thread-forming torque. This is a disadvantage because for larger fasteners, such as about ½ inch major diameter fasteners and greater, an impact driver typically is required to drive the fasteners. While an impact driver delivers sufficient torque to drive the prior fasteners, the time required to impact a large bolt into a structural member in the past was not commercially practical. The present fasteners 388, 362 may require an impact driver to provide the thread-forming torque 426 to advance the thread-forming portion 350 into the fastener opening, but the drive torque 424 of the present fasteners is sufficiently lower than the thread-forming torque 426 that the driver may easily turn the threaded portion 348 into the fastener opening without binding and engaging the impact mechanism. With the impact mechanism disengaged while installing the threaded portion, the fastener may be rapidly installed. Alternatively, the threading 426 torque may be low enough that an impact driver is not required and a drill driver may be used.

The thread-forming fastener 388 and the self-drilling, thread-forming fastener 362 may be nutable, i.e., adapted to thread a nut on the fastener. For a nut to be threaded onto the fastener 388, 362, the major diameter 342 of the thread-forming portion 350 may be about the same diameter or smaller than the major diameter of the threaded portion 348. The thread profile of the thread-forming portion 350 corresponds to the threaded portion 348 to enable the nut to be threaded over the thread-forming portion. Additionally, for a nutable self-drilling, thread-forming fastener 362, the fluted lead portion 360 has a nominal diameter smaller than the minor diameter of the corresponding nut such that the nut will pass over the fluted lead portion 360.

In one alternative, the thread-forming fasteners 388 and the self-drilling, thread-forming fasteners 362 may be configured to be used in place of bolt-and-nut fasteners without changing the hole sizes and hole placement in the building members. The major diameter of the threaded portion 348 may be selected to be installed into standard-size punched or drilled holes provided in the building members. For example, a building connection designed for a ½ inch bolt-and-nut fastener may be fabricated with punched holes having a diameter of 9/16 inch. The thread-forming fasteners 388 and the self-drilling, thread-forming fasteners 362 may be configured to have a major diameter of 5/8 inch, or 11/16 inch, or other major diameter providing thread engagement and seating torque as desired. By configuring the thread-forming fasteners 388 and the self-drilling, thread-forming fasteners 362, fabricators can continue producing the building members using standard-size punches or drills without costly re-tooling. It is contemplated that fasteners of this configuration may increase the capacity of the connection by 15% to 30% over prior art standard nut-and-bolt fasteners through the same size pilot hole, and in turn, can reduce the number of fasteners to carry the same load by 15% to 30%.

For certain bolted connections, the threaded portion 348 of the fastener must comply with fastener standards such as ASTM A307, ASTM A325, ASTM A354, ASTM A490, SAE J429 Grade 2, SAE J429 Grade 5, SAE J429 Grade 8, or other fastener standards. In the past, case hardened self-drilling fasteners and self-threading fasteners could not comply with these standards because of the case hardness of the prior fasteners. Prior fasteners were case hardened over the whole fastener reducing ductility and preventing their use in many structural applications. The present fasteners 388, 362 overcome some of the problems of the prior fasteners by selectively hardening portions of the fastener. Portions of the present fasteners 388, 362 may be selectively hardened, such as the tapered lead portion 346, fluted lead portion 360, and the thread-forming portion 350 to a hardness of at least HRC 50. Additionally, between about 1 and 5 threads between the threaded portion 348 and the thread-forming portion 350 may be hardened to at least HRC 50. By hardening only a portion of the fastener to at least HRC 50, the portion of the threaded portion 348 making the bolted connection may be provided with physical properties as desired in compliance with ASTM A307, ASTM A325, ASTM A354, ASTM A490, SAE J429 Grade 2, SAE J429 Grade 5, SAE J429 Grade 8 or other selected fastener standards. Typically, the fasteners 388, 362 are made with a medium carbon steel, medium carbon alloy steel, or a weathering steel in conformance with the desired fastener standard.

In one alternative, the floor joist system 400 may be a composite wall and floor joist system such as disclosed in U.S. patent application Ser. No. 12/019,372, filed Jan. 24, 2008 and published as U.S. 2009/0188187 A1. The floor joist system 400 may include the steel deck 382, fastened to the joists 394 using self-drilling, thread-forming fasteners 396. Additionally, self-drilling, thread-forming stand-off screws 3398 may be provided through the deck 382 and joist 394 adapted to be encapsulated within the concrete slab 384 providing a composite joist floor as disclosed in U.S. patent application Ser. No. 12/019,372.

The self-drilling, thread-forming stand-off screws 398 as shown in FIGS. 20A-22 typically have a major diameter between about 0.12 inch and about 3/8 inch. The self-drilling, thread-forming stand-off screws 398 may include the head 354, a stand-off portion 364 having a desired length, a seat portion 359, the threaded portion 348 as discussed above adjacent the seat portion, and the thread-forming portion 350 as discussed above adjacent the threaded portion 348 adapted to enable the fastener to engage with formed threads in a building member. The seat portion 359 may be a SEMS washer positioned adjacent the stand-off portion 364. A SEMS washer includes a washer or other member held captive on the fastener where the dimension of the fastener on each side of the SEMS washer being larger than the washer hole prevents the SEMS washer from coming off. Alternatively, the seat portion may be a flange integral to the stand-off portion 364. In yet another alternative, the seat portion 359 of the self-drilling, thread-forming stand-off screws 398 may include the head. As shown in FIG. 22, the self-drilling, thread-forming stand-off screws 398 may include an anchor member 355 formed integrally with the stand-off portion 398. The anchor member 355 may be a rolled collar as shown in FIG. 22.

As illustrated in FIG. 20B, the seat portion 359 may include serrations 351 adjacent the threaded portion 348 to engage the surface of the steel deck 382 or other building member during installation. The self-drilling, thread-forming stand-off screws 398 has the fluted lead portion 360 as discussed above adjacent the thread-forming portion 350 with a nominal diameter between about 70 and 95% of the major diameter 342 of the threaded portion adapted to form the fastener opening 378. The self-drilling, thread-forming stand-off screws 398 is installed through the steel deck 382 into the joist 394 or other building member. The fluted lead portion 360 drills through the steel deck 382 and joist, and the thread-forming portion 350 forms threads in the bore of the drilled fastener opening for the threaded portion 348 to engage the joist 394. The self-drilling, thread-forming stand-off screws 398 is tightened to clamp the deck 382 between the seat portion 359 and the threads in the joist 394 or other building member.

As shown in FIGS. 31A, 31B, 32A, and 32B, the joists 394 may be connected to the load bearing building member 410 such as the girder 386 using thread-forming fasteners 388. When connecting structural members using the thread-forming fasteners 388, the first member is provided with a clearance hole 380 larger in diameter than the major diameter of the fastener 388, and the second member is provided with the pilot hole 378 smaller in diameter than the major diameter of the fastener, typically between 80 and 98% of the major diameter 342, and typically larger than the minor diameter of the fastener 388. The joist 394 includes a joist seat 390 through which the joist 394 may be connected to the girder 386 or other load bearing member 410. As shown in FIGS. 31A, 31B, 32A, and 32B, various configurations of joist seats may be used as desired. The joist seat 390 includes one or more clearance holes 380 for fastening the joist to the load bearing member. To install the joist 394 to the girder 386 or other load bearing member, the fastener 388 positioned in the clearance hole 380 in the joist is driven into the pre-drilled hole 378 in the girder. The thread-forming portion 350 forms threads in the hole 378 enabling the threaded hole in the girder to act as a nut to clamp the joist seat between the girder and the head 354 of the fastener. Optionally, a nut may be provided and threaded onto the fastener 388 and tightened as desired.

In the past, joists were fastened to the load bearing member by welding or by a bolt-and-nut connection. The bolts used for fastening joists typically comply with ASTM A307, A354, or A325. Bolt-and-nut connections require the installer to reach both sides of the connection to hold the nut while the bolt turns. Additionally, welded connections have been a disadvantage because a trained welder must be present and perform the weld connections. The presently disclosed thread-forming fasteners 388 and self-drilling, thread-forming fastener 362 overcome these and other disadvantages, and may be installed from the top side of the joists 394. The present fasteners 388, 362 increase the speed of joist installation and decrease cost.

While certain embodiments have been described, it must be understood that various changes may be made and equivalents may be substituted without departing from the spirit or scope of the present disclosure. In addition, many modifications may be made to adapt a particular situation or material to the teachings of the disclosure without departing from its spirit or scope.

What is claimed is:

1. A fastener comprising:
    a head portion formed between a screw portion and a standoff portion;
    the head portion having a key shape which is selected from a group consisting of lobular, splinular, and polygonal;
    the key shape capable of accepting torque from a driver oriented on drive axis of the fastener;
    the standoff portion being longer than the screw portion, the standoff portion having a threaded segment, where a diameter of the standoff portion is less than or equal to a diameter of the head portion;
    the screw portion including a fluted lead end, and a thread-forming portion having lobes adapted to enable formation of threads into a metal structure; and
    where an anchor nut with a diameter larger than the diameter of the head portion is attached to the threads of the standoff portion and is encapsulated by concrete.

2. The fastener of claim 1, where the key shape is lobular and has at least 5 lobes.

3. The fastener of claim 1, where the key shape is splinular and has at least 5 splines.

4. The fastener of claim 1, where the key shape is polygonal and has at least 5 sides.

5. The fastener of claim 1, where the screw portion has a first thread and the standoff portion includes a second thread which is different from the first thread.

6. The fastener of claim 1, where the screw portion has a first thread and the standoff portion includes a second thread which is the same as the first thread.

7. The fastener of claim 1, where the head portion further comprises a seat portion having a diameter larger than the diameter of the head portion, the seat portion located on a side of the head portion closest to the screw portion.

8. The fastener of claim 1, where a second standoff portion is placed between the head portion and the screw portion.

9. The fastener of claim 1, where the threads of the standoff portion extend up to 90% of a length of the standoff portion.

10. A fastener comprising:
    a head portion, a screw portion including a fluted lead end, a standoff portion, and a shank portion;
    the fastener having a total length, defined by a tip of the fluted lead end and an end of the standoff portion;
    the head portion formed between the screw portion and the standoff portion and disposed away from the tip of the fluted lead end no more than 50% of the total length, the head portion having a key shape which is selected from a group consisting of lobular, splinular, and polygonal;
    the key shape capable of accepting torque from a driver oriented on drive axis of the fastener; and
    the standoff portion being longer than the screw portion, the standoff portion having a threaded segment, where a diameter of the standoff portion is less than or equal to a diameter of the head portion where an anchor nut with a diameter larger than the diameter of the head portion is attached to the threads of the standoff portion and is encapsulated by concrete.

11. The fastener of claim 10, where the screw portion includes a thread-forming portion having lobes adapted to enable formation of threads into a metal structure.

12. The fastener of claim 10, where the key shape is lobular and has at least 5 lobes.

13. The fastener of claim 10, where the key shape is splinular and has at least 5 splines.

14. The fastener of claim 10, where the key shape is polygonal and has at least 5 sides.

15. The fastener of claim 10, where the screw portion has a first thread and the standoff portion includes a second thread which is different from the first thread.

16. The fastener of claim 10, where the screw portion has a first thread and the standoff portion includes a second thread which is the same as the first thread.

17. The fastener of claim 10, where the head portion further comprises a seat portion having a diameter larger than the diameter of the head portion, the seat portion located on a side of the head portion closest to the screw portion.

18. The fastener of claim 10, where a second standoff portion is placed between the head portion and the screw portion.

19. The fastener of claim 10, where the threads of the standoff portion extend up to 90% of a length of the standoff portion.

* * * * *